(12) United States Patent
Janson et al.

(10) Patent No.: US 10,324,946 B2
(45) Date of Patent: Jun. 18, 2019

(54) METHODS AND SYSTEMS FOR CACHING DATA SHARED BETWEEN ORGANIZATIONS IN A MULTI-TENANT DATABASE SYSTEM

(75) Inventors: Michael Alexander Janson, Berkeley, CA (US); Sanjaya Lai, San Francisco, CA (US); Jayaprakash Pasala, Alameda, CA (US)

(73) Assignee: salesforce.com Inc., San Francisco, CA (US)

( * ) Notice: Subject to any disclaimer, the term of this patent is extended or adjusted under 35 U.S.C. 154(b) by 2232 days.

(21) Appl. No.: 13/225,123

(22) Filed: Sep. 2, 2011

(65) Prior Publication Data

US 2012/0331016 A1 Dec. 27, 2012

Related U.S. Application Data

(60) Provisional application No. 61/500,223, filed on Jun. 23, 2011.

(51) Int. Cl.
*G06F 16/00* (2019.01)
*G06F 16/25* (2019.01)
*G06F 16/14* (2019.01)
*G06F 16/2453* (2019.01)

(52) U.S. Cl.
CPC .............. *G06F 16/25* (2019.01); *G06F 16/14* (2019.01); *G06F 16/2453* (2019.01); *G06F 16/252* (2019.01)

(58) Field of Classification Search
CPC .......... G06F 17/30132; G06F 17/30457; G06F 17/3048; G06F 17/30902; G06F 16/2453; G06F 16/25; G06F 16/252; G06F 16/14; G06F 16/148
See application file for complete search history.

(56) References Cited

U.S. PATENT DOCUMENTS

| | | | |
|---|---|---|---|
| 5,715,450 A | 2/1998 | Ambrose et al. |
| 5,821,937 A | 10/1998 | Tonelli et al. |
| 5,831,610 A | 11/1998 | Tonelli et al. |
| 5,873,096 A | 2/1999 | Lim et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |

(Continued)

FOREIGN PATENT DOCUMENTS

| WO | WO/2007/143620 A2 | 12/2007 |
|---|---|---|
| WO | WO/2008/077053 A2 | 6/2008 |

(Continued)

*Primary Examiner* — Merilyn P Nguyen
(74) *Attorney, Agent, or Firm* — Lorenz & Kopf, LLP

(57) ABSTRACT

Mechanisms and methods for sharing database content between tenants in a multi-tenant database system are provided. The ability to temporarily store metadata related to the shared data for subsequent use optimizes the data transfer process for multiple data transfers. In an embodiment, the metadata is stored for a pre-determined period of time and fetched again after the period elapses if required. The metadata may be erased from temporary storage if an administrator updates the shared data.

13 Claims, 23 Drawing Sheets

(56) References Cited

U.S. PATENT DOCUMENTS

| | | |
|---|---|---|
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,549,908 B1 | 4/2003 | Loomans |
| 6,553,563 B2 | 4/2003 | Ambrose et al. |
| 6,574,635 B2 | 6/2003 | Stauber et al. |
| 6,577,726 B1 | 6/2003 | Huang et al. |
| 6,604,117 B2 | 8/2003 | Lim et al. |
| 6,604,128 B2 | 8/2003 | Diec |
| 6,609,150 B2 | 8/2003 | Lee et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,356,482 B2 | 4/2008 | Frankland et al. |
| 7,634,505 B2 | 12/2009 | Chasman et al. |
| 7,802,007 B2 | 9/2010 | Reese |
| 8,015,495 B2 | 9/2011 | Achacoso et al. |
| 8,051,101 B2 | 11/2011 | Chasman et al. |
| 8,069,153 B2 * | 11/2011 | Chan ..................... G06F 21/554 707/691 |
| 8,140,576 B1 | 3/2012 | Viripaeff et al. |
| 8,255,548 B2 | 8/2012 | Hopkins et al. |
| 8,271,837 B2 | 9/2012 | Prophete et al. |
| 8,407,184 B2 | 3/2013 | Prophete et al. |
| 8,407,338 B2 | 3/2013 | Brady |
| 8,447,779 B2 * | 5/2013 | Viripaeff ............. G06F 21/6227 707/781 |
| 8,452,726 B2 | 5/2013 | Kuruganti et al. |
| 8,484,111 B2 | 7/2013 | Frankland et al. |
| 8,620,954 B2 * | 12/2013 | Weissman ........... G06F 21/6218 707/783 |
| 8,881,129 B1 * | 11/2014 | McKinnon .......... G06F 11/3688 717/168 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2007/0078950 A1 | 4/2007 | Hopkins et al. |
| 2007/0088741 A1 * | 4/2007 | Brooks ..................... G06F 8/60 |
| 2007/0124276 A1 * | 5/2007 | Weissman ........... G06F 16/2453 |
| 2008/0010243 A1 | 1/2008 | Weissman et al. |
| 2008/0086479 A1 * | 4/2008 | Fry ..................... H04L 67/1008 |
| 2008/0147753 A1 | 6/2008 | Chasman et al. |
| 2009/0259699 A1 | 10/2009 | Chasman et al. |
| 2010/0076946 A1 | 3/2010 | Barker et al. |
| 2010/0088316 A1 | 4/2010 | Robinson et al. |
| 2010/0185593 A1 | 7/2010 | Wong et al. |
| 2010/0205243 A1 | 8/2010 | Brady |
| 2010/0223467 A1 | 9/2010 | Dismore et al. |
| 2010/0235322 A1 | 9/2010 | Kuruganti et al. |
| 2010/0235495 A1 | 9/2010 | Petersen et al. |
| 2010/0299663 A1 | 11/2010 | Weissman et al. |
| 2011/0082854 A1 * | 4/2011 | Eidson .............. G06F 16/24544 707/714 |
| 2011/0113058 A1 * | 5/2011 | Lee et al. ....................... 707/769 |
| 2011/0208858 A1 | 8/2011 | Yancey et al. |
| 2011/0213797 A1 | 9/2011 | Hess |
| 2011/0214062 A1 | 9/2011 | Doshi et al. |
| 2011/0219050 A1 * | 9/2011 | Ly ..................... G06F 17/30528 707/827 |
| 2011/0225206 A1 | 9/2011 | Sureshchandra et al. |
| 2011/0231919 A1 | 9/2011 | Vangpat et al. |
| 2011/0238760 A1 | 9/2011 | Kuruganti et al. |
| 2011/0246434 A1 | 10/2011 | Cheenath et al. |
| 2011/0246449 A1 * | 10/2011 | Collins ............. G06F 16/24542 707/715 |
| 2011/0247051 A1 | 10/2011 | Bulumulla et al. |
| 2011/0258199 A1 | 10/2011 | Oliver et al. |
| 2011/0258225 A1 | 10/2011 | Taylor et al. |
| 2011/0258242 A1 | 10/2011 | Eidson et al. |
| 2011/0258612 A1 | 10/2011 | Matthiesen et al. |
| 2011/0264650 A1 | 10/2011 | Tobin et al. |
| 2011/0264861 A1 | 10/2011 | Fee et al. |
| 2011/0265066 A1 | 10/2011 | Fee et al. |
| 2011/0265069 A1 | 10/2011 | Fee et al. |
| 2011/0270832 A1 * | 11/2011 | Le Stum ............... G06F 16/248 707/736 |
| 2011/0270885 A1 | 11/2011 | Vieira et al. |
| 2011/0276601 A1 | 11/2011 | Pin et al. |

(56) References Cited

U.S. PATENT DOCUMENTS

| | | |
|---|---|---|
| 2011/0289356 A1 | 11/2011 | Hossain et al. |
| 2011/0295728 A1 | 12/2011 | Bulumulla et al. |
| 2011/0295814 A1* | 12/2011 | Kothari ................ G06F 16/217 707/687 |
| 2011/0302133 A1 | 12/2011 | Kuruganti et al. |
| 2011/0302135 A1 | 12/2011 | Prophete et al. |
| 2011/0302212 A1 | 12/2011 | Agrawal et al. |
| 2011/0302221 A1 | 12/2011 | Tobin et al. |
| 2011/0302256 A1 | 12/2011 | Sureshehandra et al. |
| 2011/0302277 A1 | 12/2011 | Baker |
| 2011/0302454 A1 | 12/2011 | Prophete et al. |
| 2011/0302631 A1 | 12/2011 | Sureshchandra et al. |
| 2011/0307510 A1 | 12/2011 | Lopitaux et al. |
| 2011/0307695 A1 | 12/2011 | Slater |
| 2011/0321175 A1 | 12/2011 | Slater |
| 2012/0030192 A1* | 2/2012 | An .......................... G06F 16/28 707/717 |
| 2012/0059795 A1 | 3/2012 | Hersh et al. |
| 2012/0059853 A1 | 3/2012 | Jagota |
| 2012/0089550 A1 | 4/2012 | Arora et al. |
| 2012/0089610 A1 | 4/2012 | Agrawal et al. |
| 2012/0089638 A1 | 4/2012 | Jagota et al. |
| 2012/0089647 A1 | 4/2012 | Jagota et al. |
| 2012/0140923 A1 | 6/2012 | Lee et al. |
| 2012/0143916 A1 | 6/2012 | Viripaeff et al. |
| 2012/0144023 A1 | 6/2012 | Guest et al. |
| 2012/0144024 A1 | 6/2012 | Lee |
| 2012/0144313 A1 | 6/2012 | Park et al. |
| 2012/0144332 A1 | 6/2012 | Sola |
| 2012/0144340 A1 | 6/2012 | Knight |
| 2012/0144501 A1 | 6/2012 | Vangpat |
| 2012/0173485 A1 | 7/2012 | Kothule et al. |
| 2012/0173513 A1* | 7/2012 | Agrawal ............... H05K 999/99 707/716 |
| 2012/0173589 A1* | 7/2012 | Kwon ............... G06F 17/30575 707/803 |
| 2012/0190432 A1 | 7/2012 | Nathanson |
| 2012/0197948 A1 | 8/2012 | Tsai et al. |
| 2012/0198279 A1 | 8/2012 | Schroeder |
| 2012/0233212 A1 | 9/2012 | Newton et al. |
| 2012/0239619 A9 | 9/2012 | Hersh et al. |
| 2012/0254221 A1 | 10/2012 | Lai et al. |
| 2012/0271857 A1 | 10/2012 | Chasman et al. |
| 2012/0304014 A1 | 11/2012 | Prophete et al. |
| 2012/0317121 A1 | 12/2012 | Fuchs et al. |
| 2012/0317149 A1 | 12/2012 | Jagota et al. |
| 2012/0317238 A1 | 12/2012 | Beard |
| 2012/0330644 A1 | 12/2012 | Giraudy et al. |
| 2012/0330915 A1 | 12/2012 | Mehra |
| 2012/0330926 A1 | 12/2012 | Rajan et al. |
| 2012/0331000 A1 | 12/2012 | Mehra |
| 2012/0331016 A1 | 12/2012 | Janson et al. |
| 2012/0331518 A1 | 12/2012 | Lee |
| 2012/0331536 A1 | 12/2012 | Chabbewal et al. |
| 2013/0006402 A1 | 1/2013 | Carlberg et al. |
| 2013/0007062 A1 | 1/2013 | Dutta et al. |
| 2013/0007523 A1 | 1/2013 | Unger et al. |
| 2013/0007862 A1 | 1/2013 | Kincaid |
| 2013/0018869 A1 | 1/2013 | Hanson et al. |
| 2013/0018955 A1 | 1/2013 | Thaxton et al. |
| 2013/0019106 A1 | 1/2013 | Fischer |
| 2013/0024454 A1 | 1/2013 | Dunn |
| 2013/0024788 A1 | 1/2013 | Olsen et al. |
| 2013/0024795 A1 | 1/2013 | Robotham et al. |
| 2013/0024843 A1 | 1/2013 | Kutlu |
| 2013/0024910 A1 | 1/2013 | Verma et al. |
| 2013/0031144 A1 | 1/2013 | Elango et al. |
| 2013/0031172 A1 | 1/2013 | Olsen et al. |
| 2013/0031245 A1 | 1/2013 | Subramanian et al. |
| 2013/0031496 A1 | 1/2013 | Mathrubootham et al. |
| 2013/0031613 A1 | 1/2013 | Shanabrook et al. |
| 2013/0036406 A1 | 2/2013 | Zheng et al. |
| 2013/0036407 A1 | 2/2013 | Zheng et al. |
| 2013/0036413 A1 | 2/2013 | Venkatesan et al. |
| 2013/0041912 A1 | 2/2013 | Arora et al. |
| 2013/0042146 A1 | 2/2013 | Unger et al. |
| 2013/0054582 A1 | 2/2013 | Macklem et al. |
| 2013/0054714 A1 | 2/2013 | Bedi |
| 2013/0054792 A1 | 2/2013 | Sharaf |
| 2013/0055118 A1 | 2/2013 | Donovan et al. |
| 2013/0055147 A1 | 2/2013 | Vasudev et al. |
| 2013/0055201 A1 | 2/2013 | No et al. |
| 2013/0060859 A1 | 3/2013 | Olsen et al. |
| 2013/0061156 A1 | 3/2013 | Olsen et al. |
| 2013/0085745 A1 | 4/2013 | Koister et al. |
| 2013/0086670 A1 | 4/2013 | Vangpat et al. |
| 2013/0091149 A1 | 4/2013 | Dunn et al. |
| 2013/0091217 A1 | 4/2013 | Schneider |
| 2013/0091229 A1 | 4/2013 | Dunn et al. |
| 2013/0091350 A1 | 4/2013 | Gluck |
| 2013/0097253 A1 | 4/2013 | Mencke |
| 2013/0097713 A1 | 4/2013 | White |
| 2013/0103640 A1 | 4/2013 | Rehman |
| 2013/0103641 A1 | 4/2013 | Rehman |
| 2013/0117353 A1 | 5/2013 | Wong et al. |
| 2013/0132861 A1 | 5/2013 | Kienzle et al. |
| 2013/0145445 A1 | 6/2013 | Lee |
| 2013/0151231 A1 | 6/2013 | Giraudy et al. |

FOREIGN PATENT DOCUMENTS

| | | |
|---|---|---|
| WO | WO/2010/135696 A1 | 11/2010 |
| WO | WO/2012/048092 A2 | 4/2012 |

\* cited by examiner

METHODS AND SYSTEMS FOR CACHING DATA SHARED BETWEEN ORGANIZATIONS IN A MULTI-TENANT DATABASE SYSTEM

CLAIM OF PRIORITY

This application claims the benefit of U.S. Provisional Patent Application 61/500,223 entitled METHODS AND SYSTEMS FOR CACHING DATA SHARED BETWEEN ORGANIZATIONS IN A MULTI-TENANT DATABASE SYSTEM by Michael Alexander Janson et al., filed on Jun. 23, 2011, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

The following commonly owned, co-pending United States Patents and Patent Applications, including the present application, are related to each other. Each of the other patents/applications are incorporated by reference herein in its entirety:

U.S. Provisional Patent Application 61/500,223 entitled METHODS AND SYSTEMS FOR CACHING DATA SHARED BETWEEN ORGANIZATIONS IN A MULTI-TENANT DATABASE SYSTEM by Mike Janson et al., filed on Jun. 23, 2011 , the entire contents of which are incorporated herein by reference.

U.S. patent application Ser. No. 13/225,123 entitled METHODS AND SYSTEMS FOR CACHING DATA SHARED BETWEEN ORGANIZATIONS IN A MULTI-TENANT DATABASE SYSTEM, by Michael Alexander Janson et al., filed Sep. 2, 2011.

FIELD OF THE INVENTION

The current invention relates generally to sharing data in a multitenant database system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system, information relevant to the request. The rapid and efficient retrieval of accurate information and subsequent delivery of this information to the user system has been and continues to be a goal of administrators of database systems.

In a multi-tenant database system, tenants may want to share data with each other. Each time a tenant requests to share data, the data has to be fetched from one tenant's storage space and transferred to the second tenant's storage space. In addition to fetching data, the metadata associated with the data has to be fetched. Fetching data and metadata is a time consuming process.

Accordingly, it is desirable to provide techniques for faster transfer of data between tenants.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for sharing data in a multi-tenant database system.

Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Mechanisms and methods for sharing data between tenants will be described with reference to example embodiments.

Figure 1:
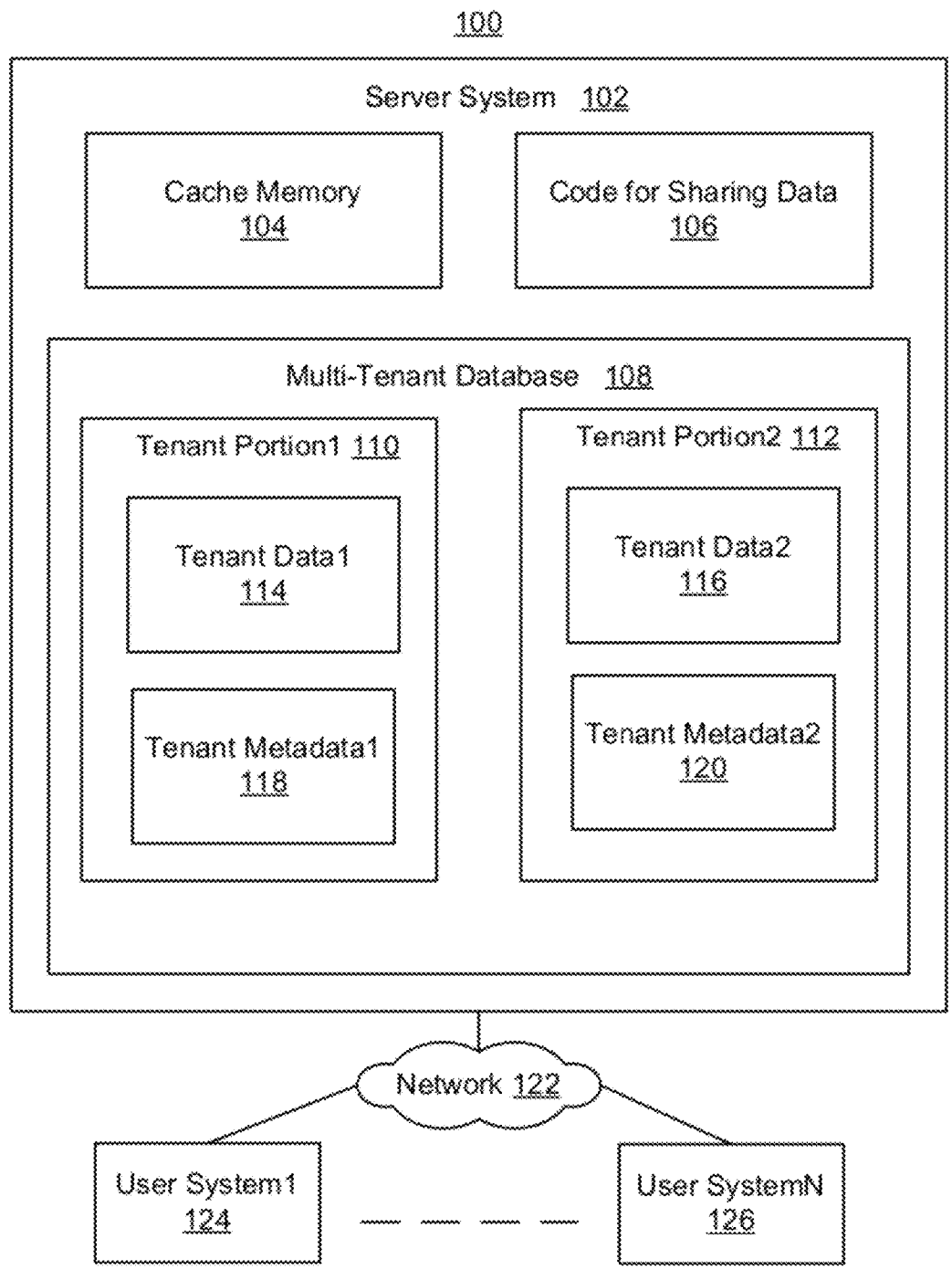
FIG. 1 shows a block diagram of an embodiment of a data sharing system.

FIG. 1 shows an embodiment of a block diagram of system 100 of sharing data in an on-demand, multitenant database system. In an embodiment, system 100 may include host server system 102, cache memory 104, code for sharing data 106, multi-tenant database 108, tenant portion1 110, tenant portion2 112, tenant data1 114, tenant data2 116, tenant metadata1 118, tenant metadata2 120, network 122, user system$_1$ 124 and user system$_N$ 126. In other embodiments system 100 may not have all of the elements or features listed and/or may have other elements or features instead of or in addition to those listed.

System 100 is a system for sharing data between multiple tenants in an on-demand, multitenant database system (system 100). Tenant to tenant implementations facilitate cross-organization data sharing and synchronization in a multi-tenant environment.

An on-demand multi-tenant database is provided with a multithreaded, message driven approach of managing through put. Cross instance (XI) API traffic for accessing mostly static (or infrequently updated) metadata, such as partner organization, currency, and custom field/object definition is diminished when transferring data by caching metadata (as compared to the traffic that would exist were the metadata not cached). Most of the data (which is read only) that is fetched repeatedly via XI API is cached in order to minimize the amount of redundant traffic by utilizing memcached (http://memcached.org). In an embodiment, the Memcached may provide a distributed memory object caching system, generic in nature, but may be intended for use in speeding up dynamic web applications by alleviating load on the distributed server system of the multitenant database system. In an embodiment, the memcached stores an in-memory key-value for small chunks of arbitrary data (strings, objects) from results of database calls, API calls, or page rendering. In an embodiment, the system takes memory from parts of the system where there is more memory than needed, the extra memory is made accessible to areas that have less memory than needed. By sharing caches less effort is required to keep the caches consistent across all of nodes. In an embodiment, using memcached, all of the servers access the same virtual pool of memory. In embodiment, a given item is always stored and always retrieved from the same location in the web cluster. As the demand for an application grows to the point where more servers are needed, it generally also grows in terms of the data that must be regularly accessed. In other embodiments, other caching infrastructure may be used instead of Memcached.

In an embodiment, a call is intercepted between two tenants in a multi-tenant database system. The call that is intercepted may be a transfer of data. A key associated with the call is generated. The cache associated with the key is consulted, and information is returned to the calling tenant. The re-fetching of static or slowly changing metadata is avoided by maintaining a short-lived local copy of the data in cache. Before the cache metadata enhancement, a partner context was re-initialized for each handler "batch" (which may be up to 500 events returned for each Message Queue (MQ) peek set—the peek set is a small subset of the messages in the MQ that is easily retrievable, whereas the entire MQ may contain millions of messages and consequently each batch may be quite large and the reinitialization may use a significant amount of resources). The slowly changing metadata that is cached may include the partner-organization's currency, the owner of the partner's connection, the account type (such as business-to-business vs. business to customer), sObject (the object subscribed to) to describe the partner's subscribed objects for the connection, the partner's field and value mappings corresponding to these subscribed objects. The term "partner" may refer either to the tenant that has the subscription, or the tenant that has published the information that is being subscribed to. Where ever the term partner appears the subscriber, the publisher, or both may be substituted to get different specific embodiments. For example, in the existing implementation, when events are processed, the following occurs. Tenant to tenant messages are dequeued from the MQ table. In an embodiment, the message query table is a table in which messages are stored that are in the queue (usually backed by a table). There are different kinds of messages in the same queue. Messages in the queue may be categorized, searched for, and/or identified by the message type. In an embodiment, when a new message is received the message is placed into the MQ table, while the message is in a queue waiting to be processed, and when the message is processed the message is removed from the MQ table. In an embodiment, the MQ table may include fields for the time that the message was received, a priority indicator, and it current status. The tenant-to-tenant Message Queue Handler (MqHandler) picks tenant-to-tenant messages to create a batch having uniform tenant to organization-Id+connenction-Id (which are all for the same partner organization). The connection Id is a unique identifier for the connection and the organization Id is a unique identification for the tenant. A subscribing tenant may have connections to many publishing tenants, and a publishing tenant may have many connections to subscribing tenants. Although it might be possible to figure out the organizationid from the connectionid and the subscription object, it is computationally more efficient to supply the organizationid of the subscriber. A connection always involves two partners, and consequently to uniquely identify the call (the transfer of data) between tenants an organization ID and connection ID are needed. The tenant-to-tenant Message Queue Handler (MqHandler) then retrieves the tenant to tenant Events from the pnetQuery table using the combination of orgId+connId+sfdcId of the dequeued s2sMessages. The events are the inserts and updates associated with the sObjects (subscription objects) and mapping fields and values and synchronizing. In other words, the pnetQuery table is a table of the queries, associated with the connection, that are in a queue. The pnet-Query table has properties and data of the queries stored. PnetQueue stores more information related to the message object stored in MQ. In an embodiment, the pnetQuery table is a table of information about a partner network (the connection may be referred to as a partner network) where data from events and properties of events are stored. The tenant-to-tenant Events are in turn passed into the PartnerNetworkEvent.processEvents( )method, which is a method where the context is initialized for partner organization (there is a one-to-one relationship between the partner organizations and the connection Ids in that both partners need to have the same connection id to share data via the connection). After the context is initialized, the following information is loaded on demand via an XI API call (the information is loaded as a result of accessing the information for reading during event processing) (1) Partner subscriber-Object, which is described by entity type (the entity type is invoked from all insert and update events), (2) Partner mapped fields/values by entity type (which is also invoked from all insert and update events), (3) PartnerNetworkEventContext.getPartnerConnectionOwner( ) (which is invoked from EntityInsertEvent), (4) PartnerNetworkEventContext.getPartnerPersonAccountTypeRecordId( ) (which is invoked from SyncEvent for inserts of person accounts to partner org), and (5) PartnerNetworkEventContext.getPartnerCurrencies( ) (invoked from SyncEvent for currency fields). The Partner subscriber-Object is the object from which the information is being copied to which the subscriber is subscribed. The partner mapped field values is the values that constitute the mapping from the published object to the object where the subscriber has directed the information to be transferred. The PartnerNetworkEventContext.getPartnerConnectionOwner( ) is a method that retrieves an identifier of the user representing the partner that owns (that is a member of) the connection (which may facilitate identifying where the information is being transferred to). The PartnerNetworkEventContext.getPartnerPersonAccountTypeRecordId( ) retrieves the account type of the partner associated with different people (so that a conversion for information about the person may be transferred with the proper account type). The PartnerNetworkEventContext.getPartnerCurrencies( ) retrieves the currency of the partner uses, so that the value of the information about the money is converted to the correct currency type.

The data including the above 5 items may be cached for up to 15 minutes, for example (or for another time period), in a local cache, and re-used for every event "batch" that is processed via one or more asynchronous tenant-to-tenant events. In an embodiment, there is a default setting for the amount of time that the metadata remains in cache (e.g., 15 minutes), and an administrator or other user with the appropriate access privileges may adjust the amount of time that the metadata stays in cache. In other embodiments other amounts of time may be chosen for the amount of time that the items may be cached, such as 5 minutes, 10 minutes, or 20 minutes, for example. The caching behavior may be transparent to the end user and may be solely an optimization in the way that the metadata is not re-fetched from the partner organization. The cache that is partitioned by the client may be a PartnerMetadataCache.descCache (for #1 above storing the Partner subscriber-Object), PartnerMetadataCache.mappedFieldAndValueCache (for #2 above storing the Partner mapped fields/values), PartnerMetadataCache.queryCache (for #3-5 above storing the information returned by the PartnerNetworkEventContext.getPartnerConnectionOwner( ) which is the information about the connection type of the partner, PartnerNetworkEventContext.getPartnerPersonAccountTypeRecordId( ) which is the information about the type of account having information about the people is stored—examples of people would be contacts for sales or for leads, and PartnerNetworkEventContext.getPartnerCurrencies( ) which is the information about the how to convert the currency in transferring monetary information). The storing of the information in cache is implemented as follows. Each method call listed above is intercepted before the corresponding XI call is made. (As an aside, the first query usually loads the meta-data. In other words, the first query may check the cache, if the metadata is not in the cache then the first query loads the metadata from the partner organization.) Next a unique key is generated for the query type and the parameters of the query. Then the corresponding cache is consulted by query key to see if there is already an existing value for the unique key stored. The unique key is an identifier for the metadata. If there is an existing value stored for the metadata data identifier, the data is returned to the caller without making an XI call. Otherwise, the XI call is performed, and the results of the call are stored in cache by key before returning to the caller.

Server system 102 is a system for serving clients of a multitenant database. Server system 102 may include multiple servers and/or multiple machines on which the server applications run. Server system 102 may be part of system 100. Server system 102 may have cache memory 104, code for sharing data 106 and multi-tenant database 108 among others.

Server system 102 may run machine instructions, and include a memory storing machine instructions, for sharing data between tenants of the multi-tenant database while caching frequently used metadata thereby reducing the overhead in fetching the metadata for every transaction. The specification is not limited to the specific objects, tables or applications mentioned, but any combination of objects, tables or applications that will accomplish the same or a similar purpose may be substituted for the specific objects, tables, or applications mentioned. Cache memory 104 may be a memory which can be used for temporary storage of copies of metadata which might be used frequently. Read and write operations on cache memory may be faster than read and write operations to a multi-tenant database. Cache memory 104 may be part of a distributed memory that is shared by multiple servers. When a processor system (which will be described further in conjunction with FIG. 16) needs to read or write to a location in the memory or database, the processor system checks cache memory 104 for a copy of the data. In an embodiment if the processor system finds the data in cache memory 104 (assuming there is no indication that the data is stale or otherwise out of date), the processor reads from cache which may be faster than reading from multi-tenant database 108. Code for sharing data 106 may host multi-tenant applications which may be relational-database centric. Code for sharing data 106 may host software code to enable data sharing between tenants and metadata definitions and translations. Multi-tenant database 108 may be a database system that has multiple tenants that each has a degree of access to at least a portion of the database system that may or may not be the same as the degree of access as other tenants. Each tenant may be an individual or an organization, and each tenant may have representatives, members, employees, customers and/or other entities associated with the tenant, which in turn may also have different degrees of access to the tenant's portion of the database as a result of the tenant's tenancy of the multitenant database. The degree of access granted to those associated with the tenant and/or which entities (e.g., representatives, members, employees, customers and/or other entities) are associated with the tenant may be determined by the tenant. The database system may include multiple databases, and each database may be partitioned and/or otherwise shared amongst multiple tenants. Multi-tenant database system 108 may have any number of tenants, but at least two tenants to share data with, although for illustrative purposes FIG. 1 shows an example of multi-tenant database 108 highlighting only two tenants.

Tenant portion1 110 may be a portion of the multi-tenant database 108 that is used by a first tenant. Tenant portion2 112 may be a portion of the multi-tenant database 108 that is used by a second tenant. Tenant data1 114 may be data associated with (e.g., belonging to) the first tenant, which may store in tenant portion1 110 of multitenant database 108. Tenant data2 116 may be data associated with the second tenant, which may be stored in tenant portion2 112 of the multitenant database 108. Tenant metadata1 118 may store metadata related to the tenant of tenant portion1 110 of the multi-tenant database 108, and similarly, tenant metadata2 120 may store metadata related to the tenant associated with tenant portion2 112 of the multi-tenant database 108. In this specification, metadata refers to the information about the data in the multi-tenant database system. Metadata describes the characteristics of the data objects such as the type, the name and the size of the data. Metadata may also contain information about the data table such as the length of fields, the number of columns in a table and other information. Metadata may include the relationships associated with the data objects between which the data may be transferred. The metadata may include information associated with the tenants and the portion of the database that tenant uses. Metadata may help in understanding and interpreting the contents of a database system. For example, the first and the second columns of table 1, belonging to the first tenant, may store the first name and the last name, respectively, of a group of individuals. Table 2 of the second tenant may be synchronized with table 1 of the first tenant, and column 5 of table 2 may store a last name and column 6 may store a first name of the same group of individuals. The correspondence of the addresses of table 1 with those of table 2, the length of the corresponding fields in each table, the data type of each of the corresponding fields in each table, and/or the relationship of the corresponding columns to the rest of their respective tables in which the columns are located may all be stored as metadata.

Network 122 (which is further discussed in conjunction with FIG. 16) may be any network or combination of networks of devices that communicate with one another. Server system 102 may interact with user systems via a network using a network interface (which is also further discussed in conjunction with FIG. 16). User system$_1$ 124 through user system$_N$ 126 represent a plurality of user systems which connect to server system 102, via network 122. User systems may be devices with at least one or more processors, a memory system, an input/output system, and a network interface, for example.

Client Side Method of Requesting a Connection

Figures 2A, 2B:
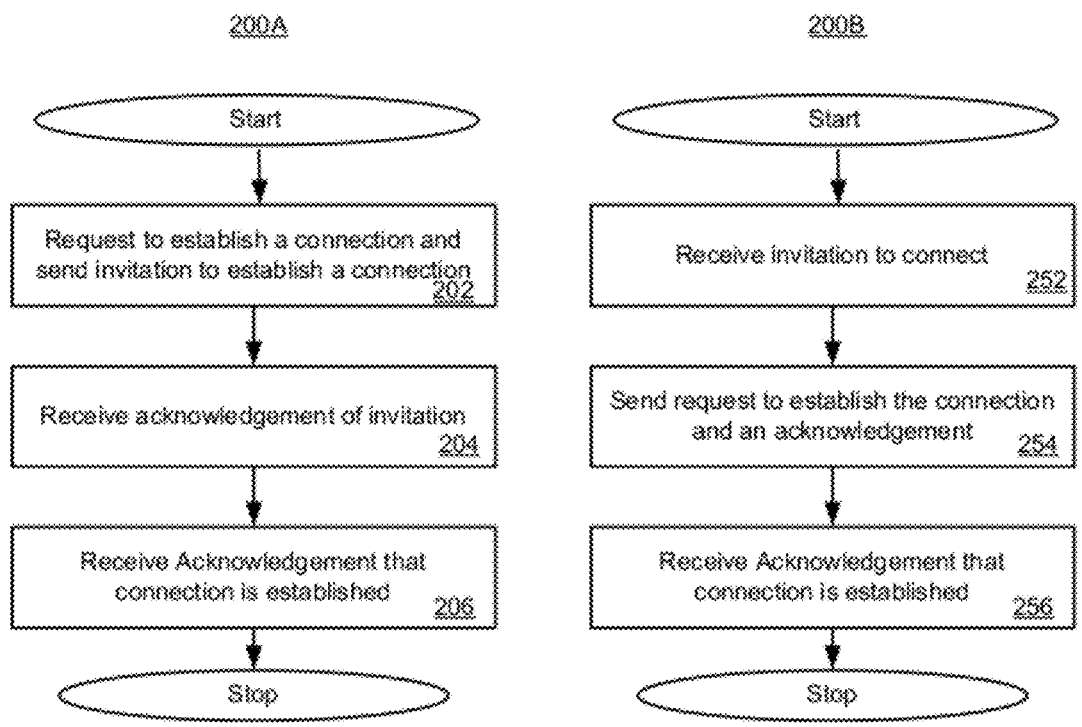
FIG. 2A shows a flowchart of an embodiment of the method performed by a tenant that invites another tenant to join a connection.
FIG. 2B shows a flowchart of an embodiment of a method performed by a tenant of accepting the invitation of FIG. 2A to join a connection.

FIG. 2A shows a flowchart of method 200A, an embodiment of a method of sending a request to establish a connection with another tenant for data sharing. In step 202, a first tenant sends an invitation a second tenant to establish a connection for sharing data. The first tenant may send a message to a server to establish a connection, which may cause the server to sends the invitation to the second tenant to establish the connection. The invitation may include a link for the second tenant, which may be used to interact with the server and accept the invitation to make a connection. The first tenant may be a tenant wishing to receive or send data for sharing with the second tenant. Account information related to the tenant such as tenant's name, a name of a representative of the tenant, contact details of the representative of the tenant may be sent along with the invitation. In step 204, the first tenant receives an acknowledgement, optionally via the server, from the second tenant accepting the invitation to connect. In step 206, the first tenant receives a message from the server acknowledging that the connection has been established between the first tenant and the second tenant. Once a connection is established the tenants can exchange data, such as by publishing data and subscribing to published data, and the first user is granted access to the connection. In an embodiment, the first user may be granted access to a shared work space and/or memory area that stores a list of data that has been published and that has been subscribed to. In an embodiment, a tenant may establish a connection with multiple tenants.

In an embodiment, each of the steps of method 200A may be a distinct step. In other embodiments, method 200A may not have all of the above steps and/or may have other steps in addition to or instead of those listed above. The steps of method 200A may be performed in another order. Subsets of the steps listed above as part of method 200A may be used to form their own method. In an embodiment, there could be multiple instances of method 200A.

Client Side Method of Accepting a Connection

FIG. 2B shows a flowchart of method 200B, an embodiment of a method of accepting a request to establish connection with another tenant for data sharing. In step 252, the second tenant receives the invitation (of method 200A), optionally via the server, from the first tenant to establish a connection for sharing data. Account information related to the tenant such as tenant's name, representative of the tenant, contact details of the representative of the tenant and a link, which when selected, brings the second tenant to a webpage at the server website for establishing the connection, may be received along with the invitation. The second tenant may be a tenant wishing to subscribe to data published by the first tenant and/or publish data for sharing with the first tenant. In step 254, the second tenant sends an acknowledgement, optionally via the server, to the first tenant accepting invitation to connect. In an embodiment the second tenant responds to the invitation by sending a message to the server that the second tenant would like the connection initiated by the first tenant to be established, and then the server may send a message to the first tenant indicating that the connection has been established. The acknowledgement may be sent after verifying the second tenant's account information. In step 256, the second tenant receives an acknowledgement from the server that connection has been established and/or receives authorization for access to the connection, which may include access to a work space and/or storage area that stores a list of the objects that were published and that are subscribed to. The second user may be granted access to tools for publishing and/or subscribing to published data. In an embodiment, a tenant may establish a connection with multiple tenants.

In an embodiment, each of the steps of method 200B may be a distinct step. In other embodiments, method 200B may not have all of the above steps and/or may have other steps in addition to or instead of those listed above. The steps of method 200B may be performed in another order. Subsets of the steps listed above as part of method 200B may be used to form their own method. In an embodiment, there could be multiple instances of method 200B.

Server Side Method of Establishing a Connection

Figure 2C:
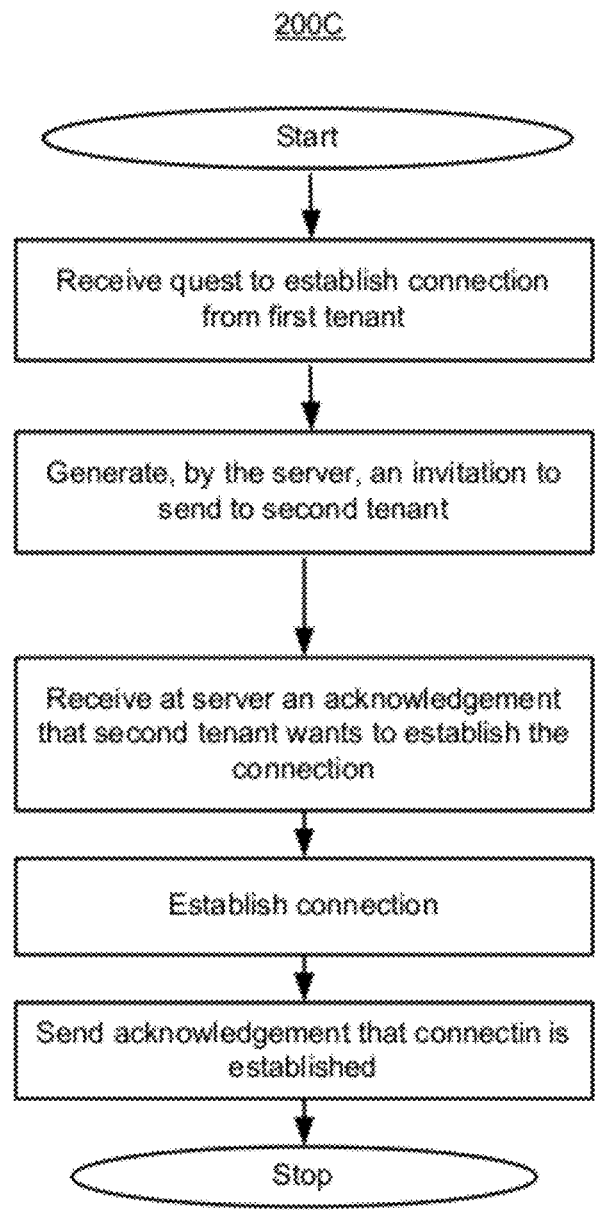
FIG. 2C shows a flowchart of an embodiment of server-side method of setting up a connection for sharing of data between the first and second tenant.

FIG. 2C shows a flowchart of an embodiment of server method 200 of setting up a connection for sharing of data between the first and second tenant. In step 272, server system 102 (discussed in conjunction with FIG. 1) may receive a request from the first tenant to establish a connection. Establishing the connection may establish a workspace that is shared by the tenants that are members of the connection, where a list of published objects that are available for subscription may be viewed. In step 274, in response, the server may send an invitation to the second tenant to join the connection and/or provide tools to the first tenant for sending an invitation to the second tenant to join the connection. In step 276, the server may receive a reply from the second tenant accepting the invitation and agreeing to establish the connection. In step 278, the server sends the acknowledgement to the first tenant. In step 280, the server establishes the connection, which may include providing the first and second tenants with tools for publishing data and subscribing to published data. Step 280 may also include establishing a shared location where both tenants may view a list of objects that have been published (if any objects have been published), which optionally may indicate which tenant published the data, and/or which tenants (if any) subscribe to the data published. Optionally it may be possible to preview published data prior to subscribing to the data and/or to view data that may have been published, whether or not the user has subscribed to the published data.

In an embodiment, each of the steps of method 200C may be a distinct step. In other embodiments, method 200C may not have all of the above steps and/or may have other steps in addition to or instead of those listed above. The steps of method 200C may be performed in another order. Subsets of the steps listed above as part of method 200C may be used to form their own method. In an embodiment, there could be multiple instances of method 200C.

Client Side Method of Publishing Data for Sharing Between Tenants

Figure 3A:
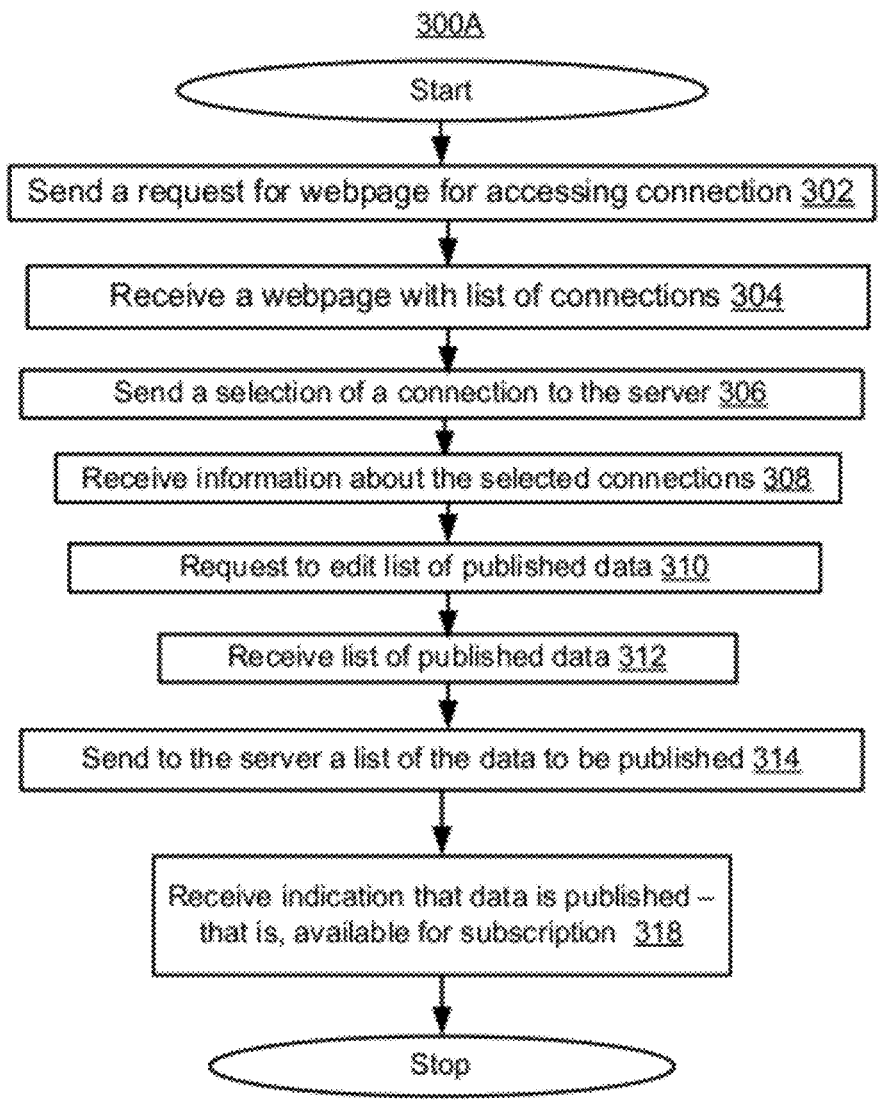
FIG. 3A shows a flowchart of an embodiment of a method of publishing data carried out by the publishing tenant.

FIG. 3A shows a flowchart of method 300A, an embodiment of a method of publishing data. Method 300A is for publishing data, which is a form of sharing using a publish-subscribe model. A tenant wishing to make the data available for others may be referred to as publishing tenant. The tenant receiving the data may be the subscribing tenant. In the publish-subscribe model, the publishing tenant publishes the list of data to share and the subscribing tenant subscribes to the data. There may be one or more subscribing tenants. In an embodiment, once a connection is established, any tenant that is connected to other tenants, via the connection, may publish or subscribe to data. As part of the same connection, the publishing tenant may subscribe to the data published by the subscribing tenant, if such data exists.

In step 302, after a connection has been established as described above in conjunction with FIGS. 2A-C, the tenant requests a webpage for accessing connections that the tenant has access to. In step 304, the tenant receives a webpage with a list of connections. In step 306, the tenant selects one of the connections and sends the selection to the server. In step 308, the tenant receives from the server a webpage related to the connection selected, and thereby receives information about the selection made. The webpage may include a link for viewing a list of data published.

In step 310, the user requests a webpage having a list of published data for editing which data is published. For example, the user may select a link for viewing a list of data published.

In step 312, the tenant receives a webpage for indicating data that has been published. The web page providing an option for indicating which object to publish or remove from being published. For example, the tenant may receive a list of objects with check marks in check boxes next to the objects and/or field that have been published and with empty check boxes next to objects and/or fields that are available for publication, but have not been published.

In step 314, the tenant selects which data should be published and/or removed from being published. In an embodiment, the tenant may select the object to publish and/or which fields in the object to publish. The tenant may interact with multiple webpages provided by the server for publishing data and/or for removing data from publication. Also as part of the step 314, the tenant machine sends to the server information indicating the tenant's selections. In step 318, the tenant receives an indication that the changes that were made to the list of published and unpublished data took effect.

In an embodiment, each of the steps of method 300A may be a distinct step. In other embodiments, method 300A may not have all of the above steps and/or may have other steps in addition to or instead of those listed above. The steps of method 300A may be performed in another order. Subsets of the steps listed above as part of method 300A may be used to form their own method. In an embodiment, there could be multiple instances of method 300A.

Client Side Method of Subscribing to Data Published by Another Tenant

Figure 3B:
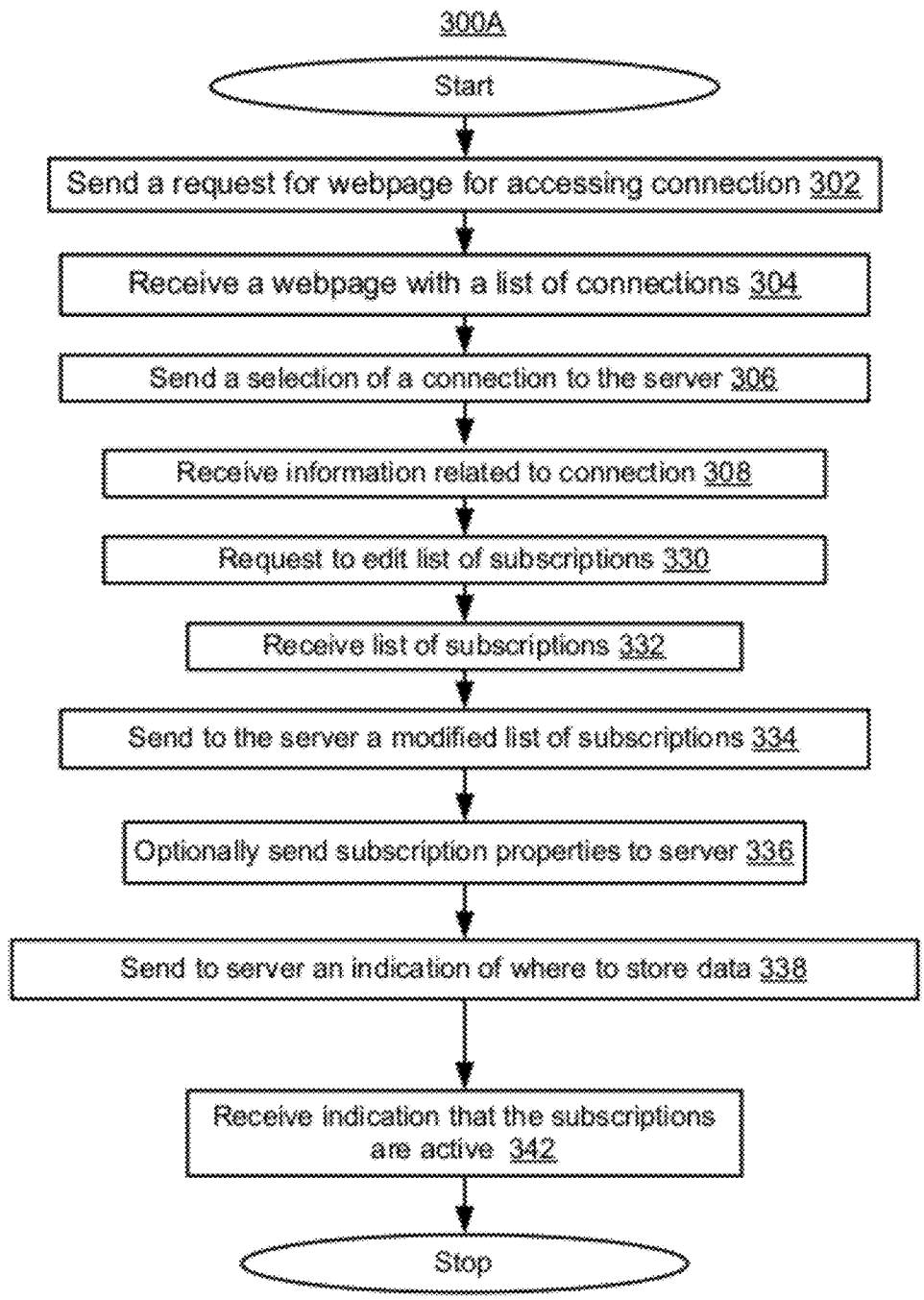
FIG. 3B shows a flowchart of an embodiment of a method of subscribing to data carried out by the subscribing tenant.

FIG. 3B shows a flowchart of method 300B, which is an embodiment of a method of subscribing to data. Method 300B is method for subscribing to data in the publish-subscription model. Steps 302, 304, 306 and 308 of method 300B may be the same as the same steps having the same numbers of method 300A. The tenant may access the same tool and/or webpages, and then be presented with a link to webpages for publishing data and with another link to webpage for subscribing to data that has been published.

In step 330, the user requests a webpage having a list of subscriptions for editing, via which the tenant may change which data the tenant has subscriptions to.

In step 332, the tenant receives a webpage indicating the data to which the tenant has subscriptions, via which the tenant may add a subscription or remove a subscription. For example, the tenant may receive a list of objects with check marks in check boxes next to the objects and/or fields to which the tenant has a subscription and with empty check boxes next to objects and/or fields to which the tenant has no subscription, but have been published and are therefore available for subscription.

In step 334, the tenant selects data to which the tenant desires to subscribe and/or unsubscribe, such as by checking or unchecking the check box next to the data in the list. In an embodiment, the tenant may subscribe to objects and/or to one or more fields in the object. The tenant may interact with multiple webpages provided by the server for subscribing to data and/or unsubscribing to data. Also in step 334, the tenant sends the modified list of subscriptions to the server.

In optional step 336 the subscribing tenant chooses data sharing properties such as how often to receive updates to the data and/or what sorts of events trigger the receipt of an update of the data. Alternatively, the conditions under which the data is updated may be preset and the tenant may not have control over how the subscription is fulfilled. For example, the subscription may synchronize the data of the publisher with the corresponding data in the subscriber's portion of the database so that whenever the publisher changes the data, the corresponding data in the subscriber's portion of the database is updated. In step 338, subscribing tenant indicates the location of where to store the data received as a result of the subscription, which may create a mapping between the published object and objects receiving the published data in the subscribing tenant's portion of the database. To fulfill the subscription, it may be necessary for the server to transform the format of the data, and the server may create a storage area for storing information about how to effect the transformation from which the metadata that will be copied to the cache may be derived. In step 342, the tenant receives an indication that the subscription is being implemented.

In an embodiment, each of the steps of method 300B may be a distinct step. In other embodiments, method 300B may not have all of the above steps and/or may have other steps in addition to or instead of those listed above. The steps of method 300B may be performed in another order. Subsets of the steps listed above as part of method 300B may be used to form their own method. In an embodiment, there could be multiple instances of method 300B.

Server Side Method of Publishing Data

Figure 4A:
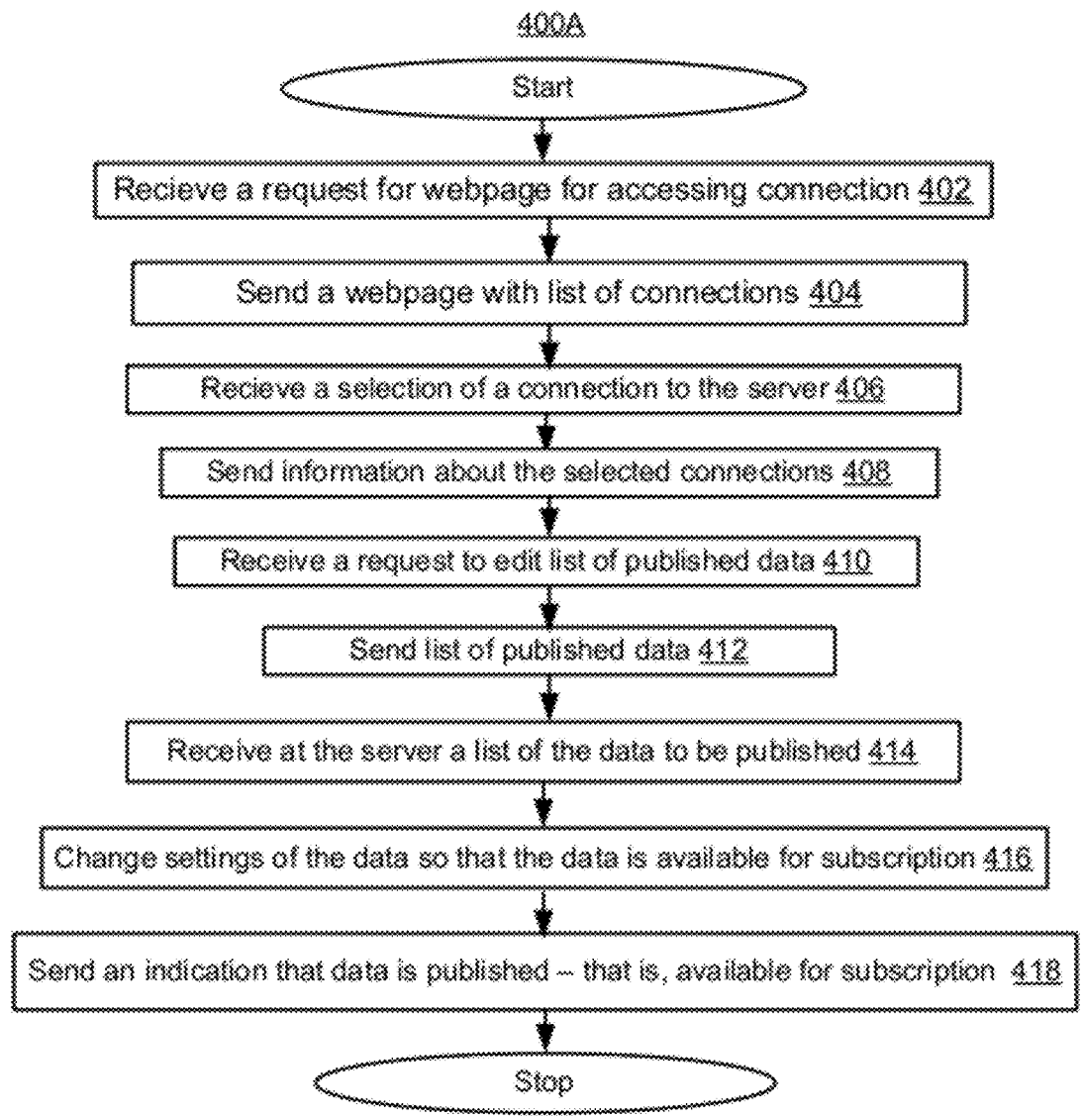
FIG. 4A shows a flowchart of an embodiment of a method of publishing data carried out by the server.

FIG. 4A shows a flowchart of method 400A, an embodiment of a method of publishing data. Method 400A is implemented by the server for publishing data. Method 400A compliments method 300A in that method 300A is carried out by the tenant's machine while communicating with the server, while method 400A is carried out by the server while communicating with the tenant's machine.

In step 402, after a connection has been established as described above in conjunction with FIGS. 2A-C, the server may receive a request for a webpage for accessing connections that the tenant has access to. In step 404, the server sends a webpage with a list of connections. In step 406, the server receives the webpage with the tenant's selection of one of the connections. In step 408, the server sends a webpage related to the connection selected, and information about the selection made. The webpage may include a link for viewing a list of published data.

In step 410, the server receives a request for a webpage having a list of data published by the tenant, which allows the tenant to edit and thereby modify which data is published. For example, the request may indicate a selection of a link for viewing list of published data.

In step 412, the server sends a webpage for indicating data that has been published. The webpage may be used for indicating which object to publish or remove from being published. For example, the server may send a list of published and non-published objects with check marks in check boxes next to the objects and/or field that have been published and with empty check boxes next to objects and/or fields that are available for publication, but have not been published.

In step 414, the server receives information indicating the tenant's selection of which data should be published and/or removed from being published. In an embodiment, the information received may indicate which objects to publish and/or which fields in the object to publish. The server may send multiple webpages to the tenant related to publishing data and/or for removing data from publication for the tenant to interact with and indicate the tenant's selection. In step 416, the server changes the settings associated with the objects selected making the data newly indicated as being published available for subscription and the data newly indicated as being unpublished not available for subscription. In step 418, the server sends an indication that the changes that were made to the list of published and unpublished data took effect. In an embodiment, each of the steps of method 400A may be a distinct step. In other embodiments, method 400A may not have all of the above steps and/or may have other steps in addition to or instead of those listed above. The steps of method 400A may be performed in another order. Subsets of the steps listed above as part of method 400A may be used to form their own method. In an embodiment, there could be multiple instances of method 400A.

Server Side Method of Subscribing to Data

Figure 4B:
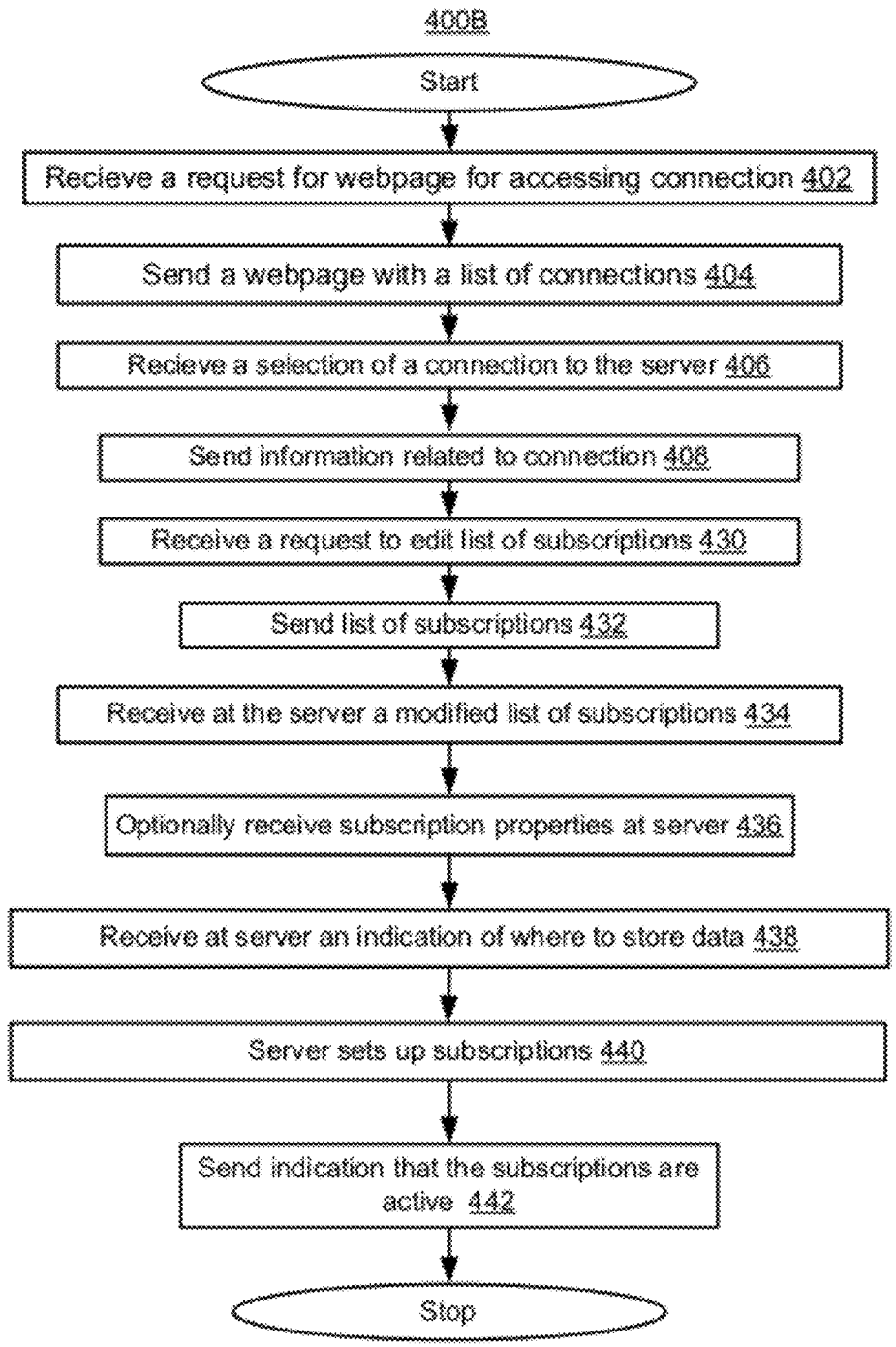
FIG. 4B shows a flowchart of an embodiment of a method of subscribing to data that is carried out by the server.

FIG. 4B shows a flowchart of method 400B, which is an embodiment of a method of subscribing to data that is carried out by the server. Method 400B is implemented by the server for subscribing to data. Method 400B compliments method 300B in that method 300B is carried out by the tenant's machine while communicating with the server, while method 400B is carried out by the server while communicating with the tenant's machine.

Method 400B is a method for subscribing to data in the publish-subscription model. Steps 402, 404, 406 and 408 of method 400B may be the same as the same steps having the same numbers of method 400A. The tenant may be granted access to the same tool and/or webpages, and then be presented with a link to webpages for publishing data and with another link to a webpage for subscribing to data that has been published.

In step 430, the server receives a request for a webpage having a list of subscriptions for editing, via which the tenant may change which data the tenant has subscriptions to.

In step 432, the server sends the webpage to the tenant regarding the data to which the tenant has subscriptions, which may indicate which data the tenant has subscribed to and which data the tenant has not subscribed to. For example, the server may send a webpage indicating the tenant's prior selections on a list of objects that are available for subscription. The list of objects may have check marks in check boxes next to the objects and/or fields indicating that the tenant has a subscription to those objects/fields and with an empty check boxes next to objects and/or fields to which the tenant has no subscription. The server may send multiple webpages to the tenant for subscribing to data and/or unsubscribing to data.

In step 434, the server receives an indication of the tenant's selection of data to which the tenant desires to subscribe and/or unsubscribe, such as with newly checked or unchecked check boxes next to the data in the list. In an embodiment, the selections may be for subscriptions to objects and/or to one or more fields in the objects.

In optional step 436 the server receives a selection form the tenant of the tenant's choices of data sharing properties such as how often to receive updates to the data and/or what sorts of events trigger the receipt of an update of the data.

Alternatively, the conditions under which the data is updated may be preset and the tenant may not have control over how the subscription is fulfilled. For example, the subscription may synchronize the data of the publisher with the corresponding data in the subscriber's portion of the database so that whenever the publisher changes the data, the corresponding data in the subscriber's portion of the database is updated. In step 438, the server receives from the tenant an indication of the location at which store the data transferred as a result of the subscription, which may create a mapping between the published object and objects receiving the published data in the subscribing tenant's portion of the database. To fulfill the subscription, it may be necessary for the server to transform the format of the data, and the server may create a storage area for storing information about how to effect the transformation from which the metadata that will be copied to the cache may be derived. In step 440 the server sets up the new subscriptions indicated and deactivates any subscriptions that are being removed. The server may store information about how to transfer data from the publishing tenant's portion of the database to the subscribing tenant's portion of the database. The information may include a mapping from one or more fields of the publishing tenant's portion of the database to corresponding fields in the subscribing member's portion of the database, where the subscriber wants the data transferred to. The server may store information such as a transformation of the data that needs to be performed, changing the font, variable type (e.g., numerical to text), and/or color of the text, for example. The data stored about the how to perform the transfer, may be collected and stored in a cache with other metadata during the data transfer. The server may also setup various triggers or hooks that cause the data to be transferred when certain events occur, such as the publisher makes a change to the data. In step 442, the server sends an indication that the subscription is being implemented.

In an embodiment, each of the steps of method 400B may be a distinct step. In other embodiments, method 400B may not have all of the above steps and/or may have other steps in addition to or instead of those listed above. The steps of method 400B may be performed in another order. Subsets of the steps listed above as part of method 400B may be used to form their own method. In an embodiment, there could be multiple instances of method 400B.

Client Side Method of Transferring Data

Figure 5:
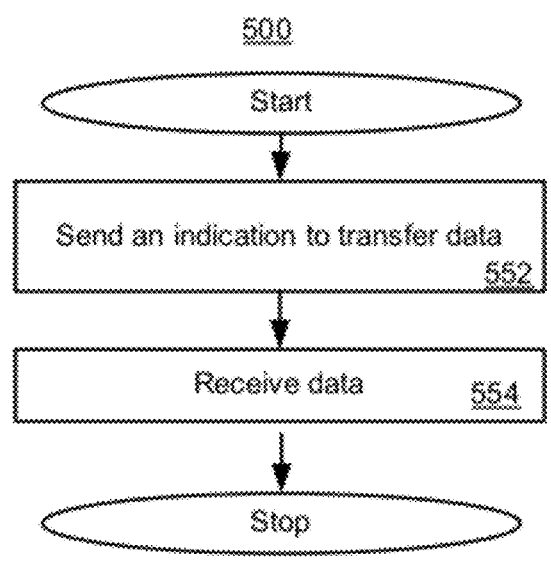
FIG. 5 shows a flowchart of an embodiment of client side method of caching data in a multi-tenant database system.

FIG. 5 shows a flowchart of an embodiment of an optional client-side method 500 of sharing. In step 552 the client, which could be the publisher or the subscriber, performs an action that triggers an initiation of a transfer of data. For example, the subscriber may have set up the subscription to send the data every time the data is altered, and the publisher may have updated the data, which may trigger the initialization of the transfer. Alternatively, in an embodiment, the subscriber or the publisher may manually press on a link that causes a one-time transfer of the data or of the changes to the data since the last transfer. Method 500 is optional, because the subscription may specify that the data or the changes in the data (since the last transfer of data) may be transferred on a periodic basis that is unrelated to the publisher's action or subscriber's actions. In optional step 554, the data is received as a result of the transfer of the data from a location in the database where the publishing tenant stores the data to a location in the database where the subscribing tenant stores the data. Although the subscribing tenant's portion of the database receives the update, the subscriber may not actually receive anything at the time of the transfer, because the subscribing tenant may not actually view or download the data until a later time, and until then the transferred data remains on the server (but in a location of the database where it previously was not).

In an embodiment, each of the steps of method 500 may be a distinct step. In other embodiments, method 500 may not have all of the above steps and/or may have other steps in addition to or instead of those listed above. The steps of method 500 may be performed in another order. Subsets of the steps listed above as part of method 500 may be used to form their own method. In an embodiment, there could be multiple instances of method 500.

Figure 6A:
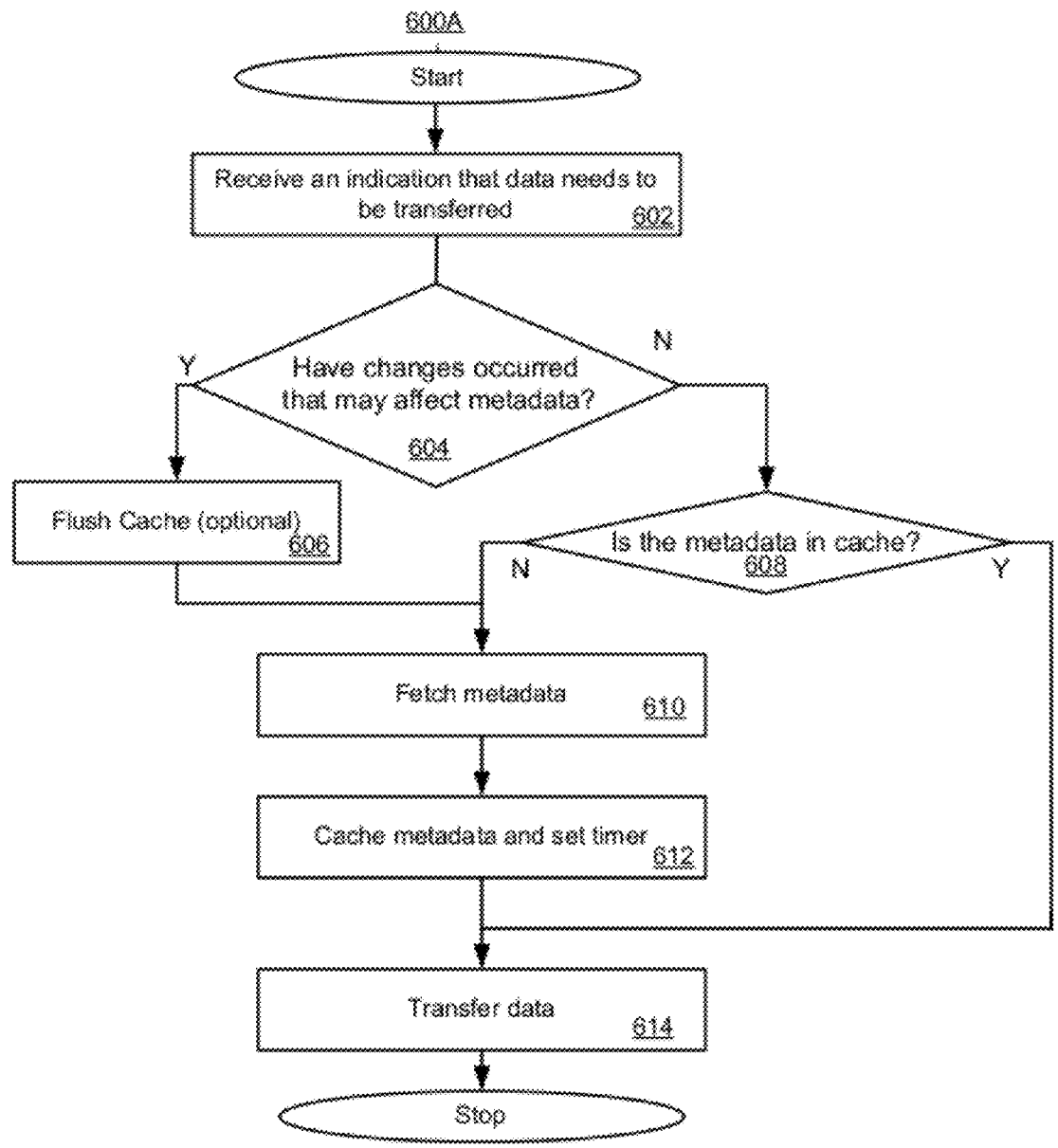
FIG. 6A shows a flowchart of an embodiment of method of determining location of metadata.

FIG. 6A shows a flowchart of an embodiment of method 600A for determining the location of metadata. The machine instructions to implement method 600A may reside in code for sharing data 106. In step 602, the server system receives an indication that data needs to be transferred. The indication may result from a publishing tenant updating published data and/or may result from the subscribing tenant requesting to refresh or to otherwise update the subscriber's copy of an object to which the subscriber subscribes. In step 604, checks are made for indications that the metadata (if in cache) may no longer be up-to-date. Metadata may be out of date due to changes made to the type of account or a change in the type of the data (e.g., whether the data is stored as a numerical value, text, logical variable, or another type of data) stored in a field of at least one of the tenants exchanging data. In an embodiment, the administrator of the multitenant database or the administrator of the tenants exchanging may be provided with an interface via which the administrator may manually request to invalidate the cached metadata (if there is metadata in the cache). If there are no changes that would invalidate any cached metadata (if cached metadata is present) and there is no indication that the metadata is out of date, method 600A proceeds to step 608. If the metadata is determined to be out of date, the method proceeds to step 606 and the metadata may be flushed from the cache. In step 608, the cache may be checked for metadata. If metadata does not exist in cache, method 600A proceeds to step 610. If the metadata exists in cache, then method proceeds to step 614. In other embodiments, method 600 may check if any metadata is in cache prior to checking whether there is an indication of whether any cached metadata may be invalid (due to a recent change that may affect the content of the metadata). In step 610, the metadata may be automatically fetched from the multitenant database which may involve automatically invoking one or multiple queries to the multi-tenant database. In step 612, the metadata may be cached for subsequent data transfers and a timer may be started to monitor the lifetime of the metadata. In an embodiment, the lifetime of metadata in cache may be configurable, and may be set to a predetermined duration of time by an administrator of the multitenant database. In another embodiment, the life of metadata may depend on the frequency that the metadata is read and/or changed. In step 614, the data may be transferred from tenant portion1 to tenant portion2. Transferring the data may involve the server system determining, based on the cached metadata, where to take the data from and where to store the transferred data. Transferring the data may include, based on the metadata, changing the format of the data fetched and/or performing a transformation on the data fetched from a format associated with the source of the data to a format associated with the target for the data. For example, the source data may show monetary values in a one currency (e.g., euros) and the data may be saved in a table of the subscribing tenant in U.S. dollars. Once valid metadata is in cache, the metadata may be read from cache and need not be fetched from the multi-tenant database for every data transfer to which the metadata is applied. The process of reading the metadata from cache may be faster than fetching metadata from the multi-tenant database, and therefore may speed the transfer process many fold. Although, in an embodiment, steps 604, 608 and 614 are invoked for each data transfer, steps 604, 608 and 614 may be repeatedly executed for multiple data transfers in a short period of time thereby improving the speed of data transfer.

In an embodiment, each of the steps of method 600A may be a distinct step. In other embodiments, method 600A may not have all of the above steps and/or may have other steps in addition to or instead of those listed above. The steps of method 600A may be performed in another order. Subsets of the steps listed above as part of method 600A may be used to form their own method. In an embodiment, there could be multiple instances of method 600A.

Figure 6B:
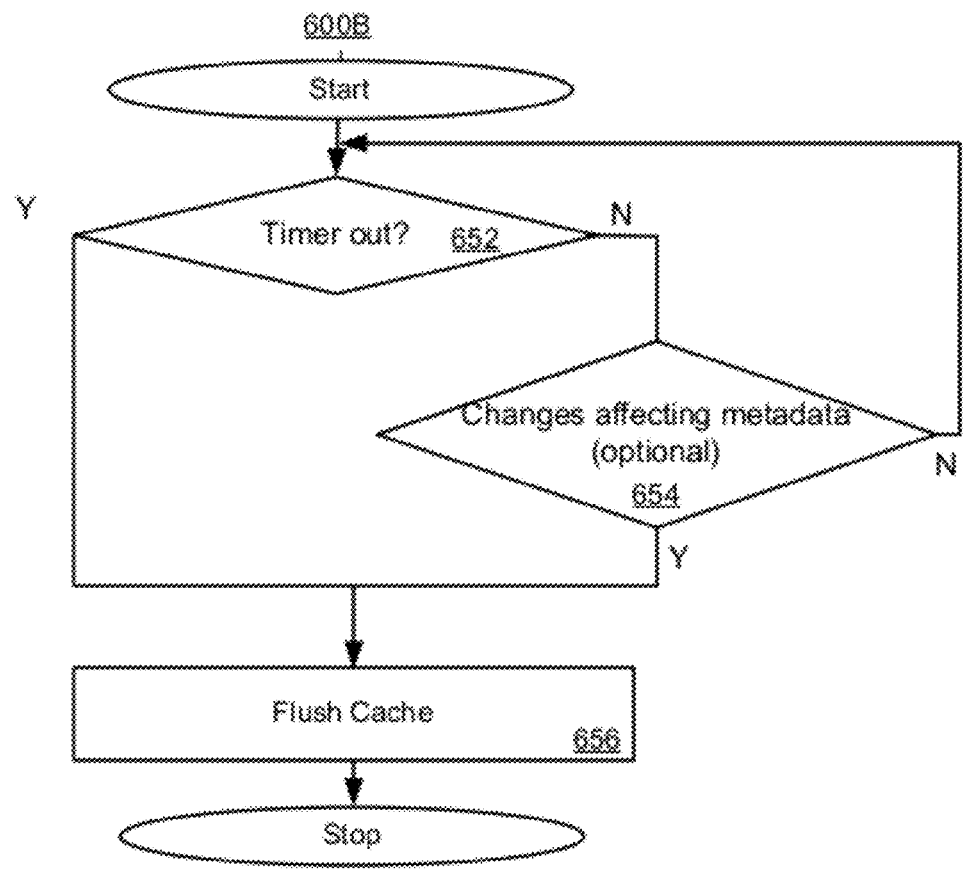
FIG. 6B shows a flowchart of an embodiment of method of determining whether to fetch new metadata.

FIG. 6B shows a flowchart of an embodiment of method 600B for determining the validity of metadata. In an embodiment, method 600B shows a method of tracking the validity of metadata. In step 652, method 600B checks if the timer has expired. If the timer has expired, method 600B proceeds to step 656 to flush the cache. If the timer has not expired, method 600B proceeds to step 654. In optional step 654, method 600B checks if there are any changes that affect the metadata. Step 654 is optional, because the same check may be made as part of step 604 of method 600A instead of or in addition to performing step 654. In an embodiment, the changes that affect the metadata could be made by an administrator of the multi-tenant database or an administrator of the tenant such as changes to the table and method 600B proceeds to step 656. If the metadata is valid, method loops back to step 652. In step 656, method 600B flushes the cache to clear the invalid data.

In the embodiment of FIG. 6B, it is assumed that once the timer runs out the data is automatically flushed and therefore no longer present, and consequently no check is performed in method 600B to see if the timer ran out. However, in an alternative embodiment, as part of step 654 and/or instead of step 608, a check may be performed as to whether the timer ran out. In an embodiment, the metadata may be stored with a time stamp, and as part step 604 and/or instead of step 608, method 600A may check whether the time stamp has expired, and the expired metadata might not actually be flushed until the check is performed (as part of step 654 and/or step 608) to see whether the metadata has expired. In another embodiment, in FIG. 6B, as part method 600B, optionally, the same checks that are performed during step 604 may be performed instead of, or in addition to, performing those checks (for whether the metadata is out of date) as part of step 604.

In an embodiment, each of the steps of method 600B may be a distinct step. In other embodiments, method 600B may not have all of the above steps and/or may have other steps in addition to or instead of those listed above. The steps of method 600B may be performed in another order. Subsets of the steps listed above as part of method 600B may be used to form their own method. In an embodiment, there could be multiple instances of method 600B.

Screenshots

Figure 7:
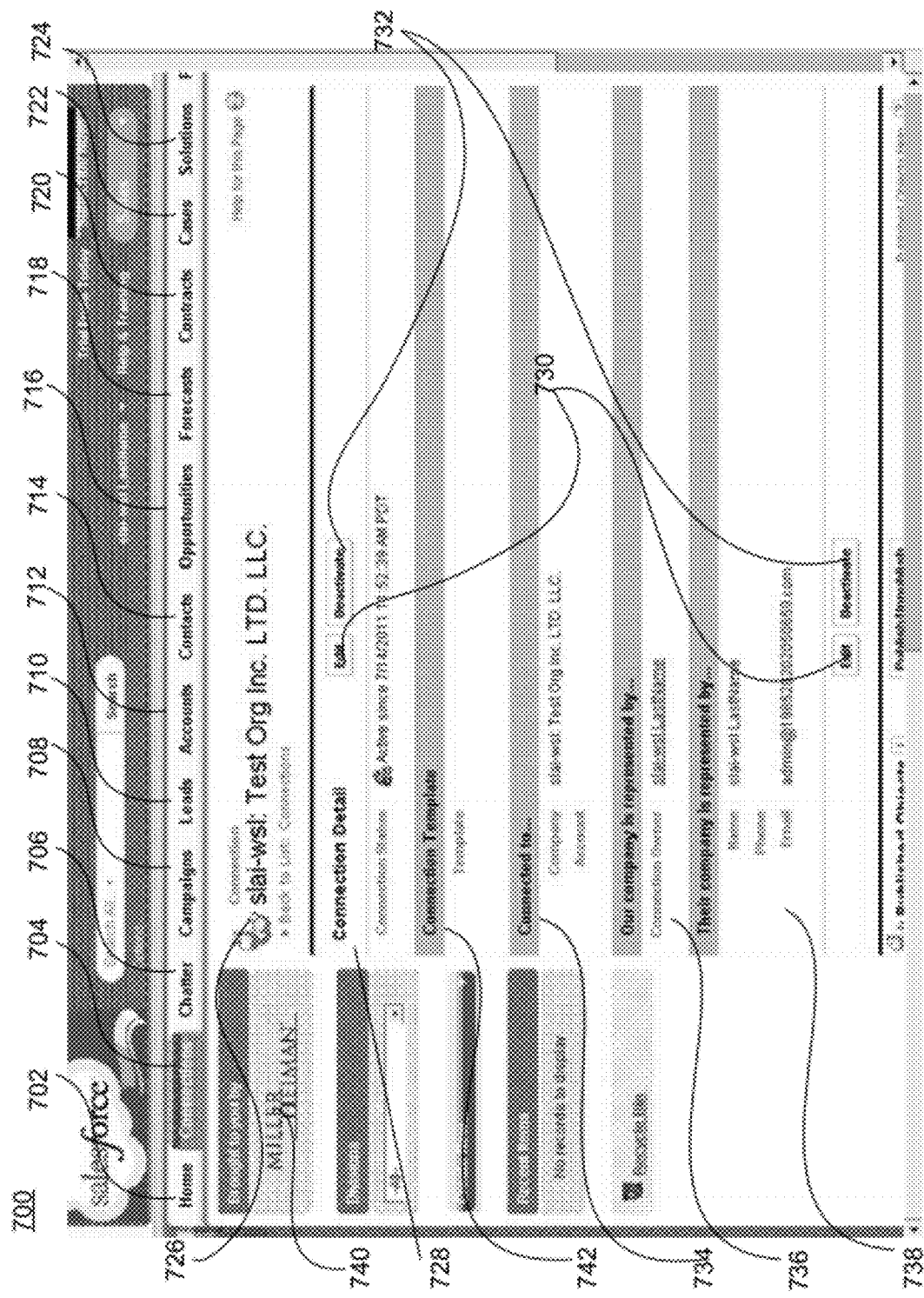
FIG. 7 shows a screenshot of an embodiment of a portion of connections webpage.

FIG. 7 shows screenshot 700 of an embodiment of a webpage showing partial details of a tenant sharing data with other tenants in a multi-tenant database system. Screenshot 700 may include home tab 702, connections tab 704, chatter tab 706, campaigns tab 708, leads tab 710, accounts tab 712, contacts tab 714, forecast tab 716, contracts tab 720, cases tab 722, solutions tabs 724, tenant 726, connection details 728, edit button 730, deactivate button 732, connected 734, our representative 736, their representative 738, sponsor 740, and connection template 742. In other embodiments, screenshot 700 may not have all of the elements listed and/or may have other elements instead of or in addition to those listed.

Screenshot 700 may be a screenshot of a web page for managing connections for sharing data with other tenants of the multi-tenant database with other tenants. Screenshot 700 shows an example of a webpage according to a publish-subscribe model for sharing data. In the publish-subscribe model, a first tenant (also referred to in this discussion as the publishing tenant) publishes a list of data objects to share. Other tenants (subscribing tenants) can choose from the available list of the data objects to accept. A publishing tenant may be a subscriber to the data of another tenant. Data sharing may be one way, where the publishing tenant shares the published data with the subscribers. In another embodiment data may be shared between tenants, i.e. an update of data in one tenant may trigger an update in the other tenant. Sharing of data can happen automatically where an update of data in one tenant automatically updates other subscribed tenants.

Figure 8:
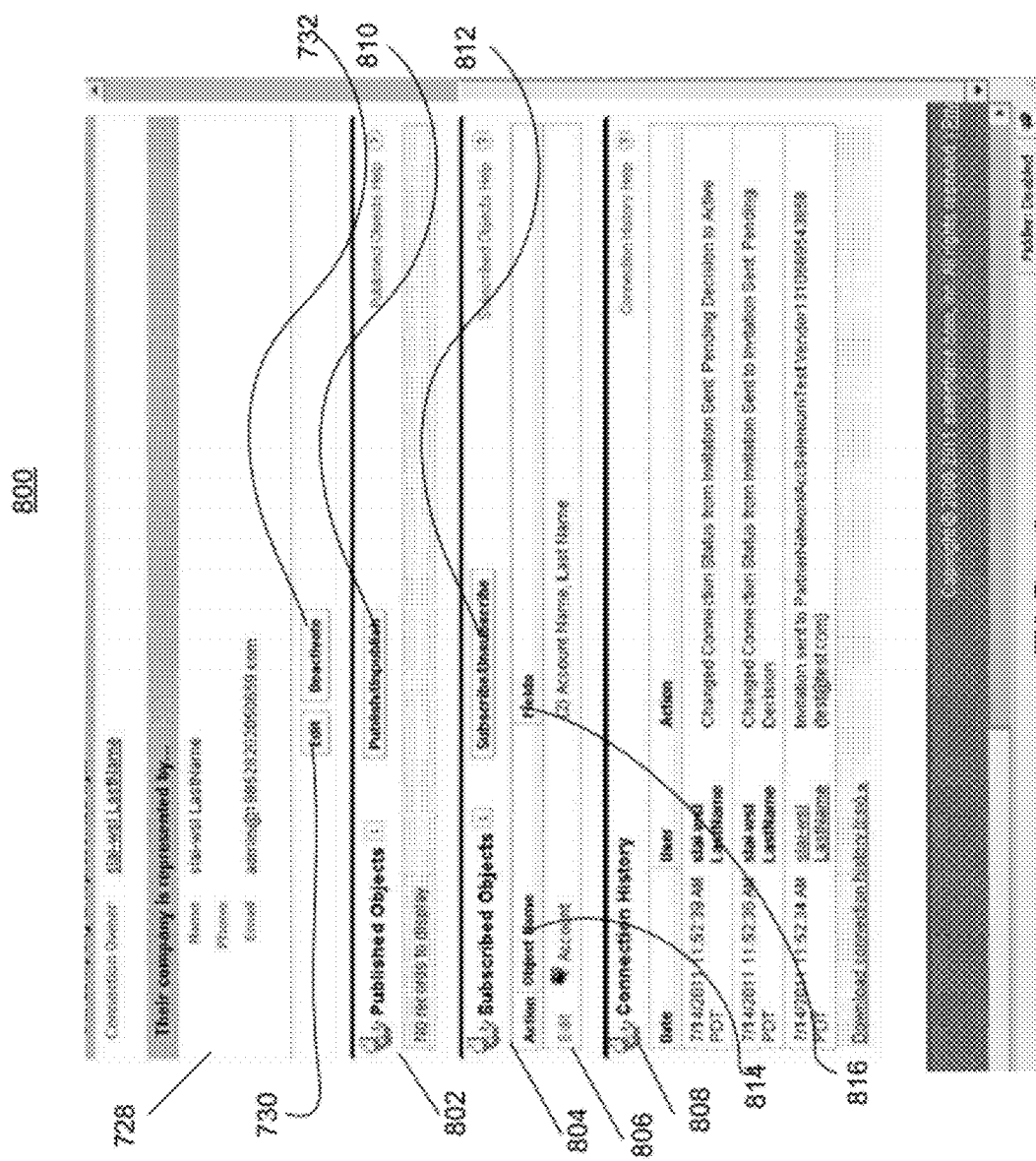
FIG. 8 shows a screenshot of an embodiment of another portion of the connections webpage, which is a continuation of the connection page of FIG. 7.

The portion of the webpage of screen shot 700 is used by a particular tenant to request and/or establish a connection to other tenants. In an embodiment, prior to two tenants establishing the connection, the two tenants cannot share data. After establishing the connection, either one of the tenants may publish objects and subscribe to the objects that the other published. Home tab 702 when selected may cause a webpage to appear that may be the home page of the tenant. Connections tab 704 is the tab that is currently selected in FIG. 7. When connection tab 704 is selected, the user is brought to the webpage shown in FIG. 7. Chatter tab 706 when selected causes a webpage with conversations between tenants to appear. Campaigns tab 708 when selected causes a webpage with a list of the tenant's sales campaigns to appear. Leads tab 710, when selected, shows a webpage with the sales leads of the tenant. Accounts tab 712, when selected, shows the details of the accounts of the tenant's clients. Contacts tab 714, when selected, causes a webpage to appear, which lists the contacts of the tenant that the tenant may use for contacting the tenant's customers, potential customers, and/or other associates. Forecast tab 716, when selected, shows a webpage having sales forecasts of the tenant's sales. Contracts tab 720 when selected causes a webpage to appear having links for viewing the contracts the tenant is involved in. Cases tab 722, when selected, causes a webpage to appear having links to cases being discussed in the customer support forum. Solutions tabs 724 when selected shows a webpage with solutions to cases or queries in the customer support forum. Tenant 726 shows the user name of the current user who is logged in and the tenant organization associated with the user. Connection details 728 shows the details of the connection such as with who the connection is with, the representative of the connected company and the representative of the tenant. Edit button 730 when selected causes a webpage to appear with a user interface to edit user information. Deactivate button 732 when selected deactivates a subscription or publication of data, which may thereby result in the associated data not being shared. Connected 734 lists the tenant with whom the connection is with. Our representative 736 displays the representative of the tenant. Their representative 738 displays the representative of the connected tenant. Regarding our representative 736 and their representative 738, in an embodiment, only the designated representative may alter the connection setting, publication settings, and/or subscription settings. Our representative 736 and their representative 738 may be referred to as the connection owners, and in an embodiment are listed in the system as being responsible for the connection. In an embodiment, the representative may just be a contact person to talk to about the connection settings, but others may also be authorized to change the connection settings. In an embodiment, each user has a profile, and the profile includes permissions that designate the resources that the user is authorized to access. In an embodiment, in order to access and manage the connection, the user permission must be set to manage connection, and consequently our representative 736 and their representative 738 would need to have user profiles with the permission of manage connection. In an embodiment, any user (not just our representative 736 and their representative 738) that has a permission of manage connection may alter the connection settings, publication settings, and/or subscription settings associated with the tenant that the user is associated with. In an embodiment, a connection of a tenant may be altered by any user associated with the tenant that has the permission of manage connection. Sponsor 740 may be the sponsor of the website. Connection template 742 shows a connection template. The connection template may be a list of stored settings that the tenant typically uses when establishing a connection. When creating a new connection, the tenant may first load the connection template as the connection settings then modify the resulting connection settings for the specifics of the current connection FIG. 8 shows screenshot 800 of an embodiment of a portion of a webpage for managing connections with other tenants in a multi-tenant database system. Screenshot 800 is a screenshot of a webpage that may be a continuation of the webpage of screenshot 700. Screenshot 800 may include connection details 728, edit button 730, deactivate button 732, published objects 802, subscribed objects 804, edit subscribed objects 806, connection history 808, publish button 810, subscribe button 812, object 814, and fields 816. In other embodiments, screenshot 800 may not have all of the elements listed and/or may have other elements instead of or in addition to those listed.

Screenshot 800 shows a portion of a webpage for managing connections. Screenshot 800 shows published and subscribed data sharing objects and the connection history. Published objects 802 is a list of objects published by the user for sharing with other users. In the example of screenshot 800 no objects are listed for sharing. Subscribed objects 804 is a list of data objects (of other tenants) and associated data fields that the current tenant subscribed to. Edit subscribed objects 806 when selected, displays a webpage similar to screenshot 1100 (which will be described in conjunction with FIG. 11), which may be used to add or delete data objects to which the tenant is subscribed. Connection history 808 lists dates of the actions and/or events that occurred related to the status of the connection, such as changes made to the connection settings and/or whether an invitation to establish a connection was accepted, declined, or ignored. Publish button 810, when selected, publishes a list of selected data fields associated with the listed data objects to share with other tenants in the multitenant database system. A tenant may want to only publish certain fields of an object instead of publishing the entire object. Subscribe button 812, when selected, subscribes to the list of data fields and objects under subscribed objects 804 which the user may want to receive from other tenants in the multitenant database system. Object 814 lists the data objects which are subscribed to. Fields 816 list the data fields of the data object 812.

Figure 9:
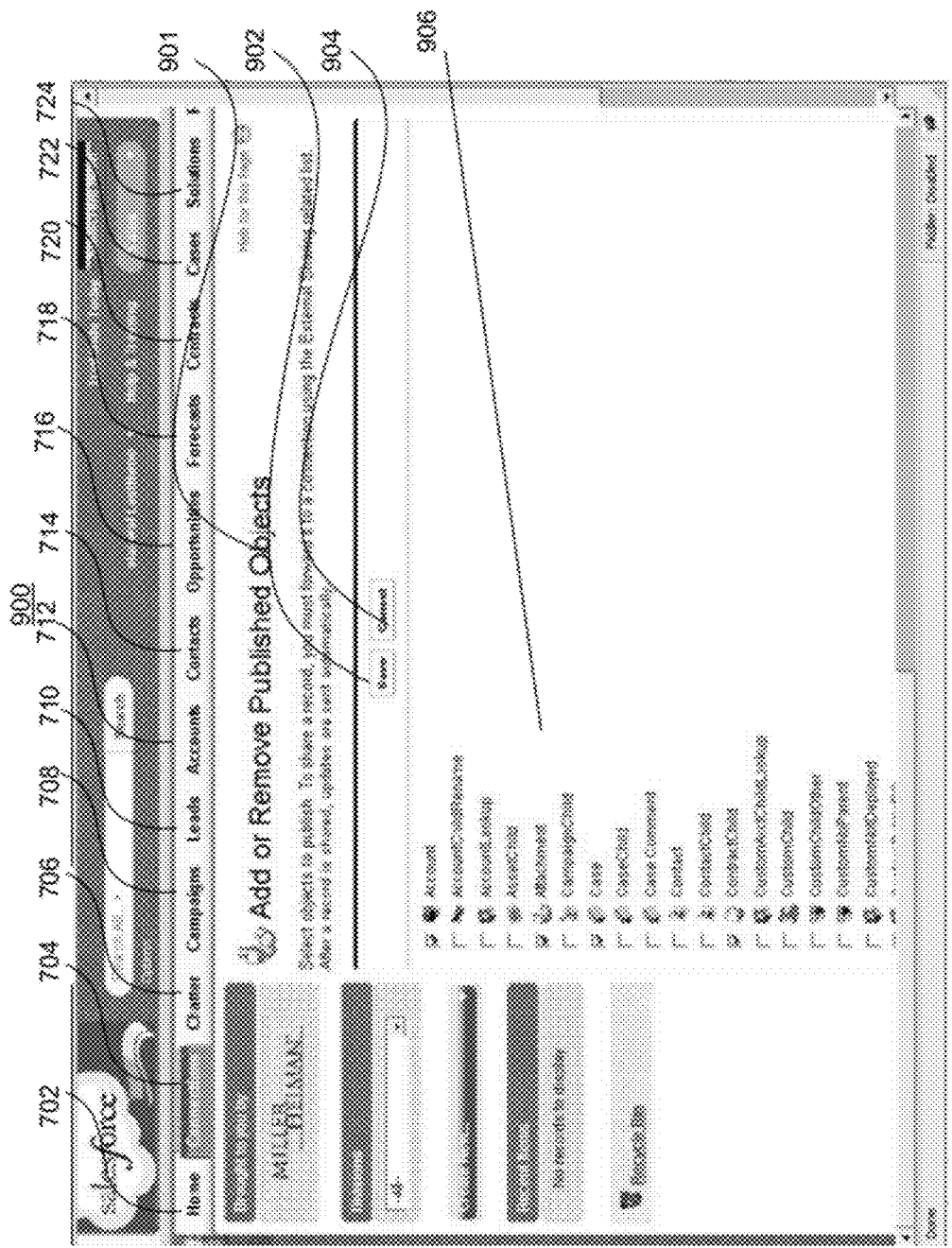
FIG. 9 shows a screenshot of an embodiment of the top part of a webpage for publishing data objects.

FIG. 9 shows screenshot 900 of an embodiment of a partial webpage showing details of a tenant selecting data to share with other tenants in a multi-tenant database system. Screenshot 900 may include home tab 702, connections tab 704, chatter tab 706, campaigns tab 708, leads tab 710, accounts tab 712, contacts tab 714, forecast tab 716, contracts tab 720, cases tab 722, solutions tabs 724, title 901, save button 902, cancel button 904 and data objects to publish 906. In other embodiments, screenshot 900 may not have all of the elements listed and/or may have other elements instead of or in addition to those listed.

Screenshot 900 shows a list of data objects for sharing. Home tab 702, connections tab 704, chatter tab 706, campaigns tab 708, leads tab 710, accounts tab 712, contacts tab 714, forecast tab 716, contracts tab 720, cases tab 722, and solutions tabs 724 were described in conjunction with FIG. 7. Title 901 shows the title of the section listing data objects which the tenant may share with other tenants. Save button 902, when selected, may save the current settings, which may result in publishing any of the selected data objects that were not already published. Cancel button 904 when selected, may undo any changes made to the selection of items that are to be published or unpublished. Data objects to publish 906 lists the data objects available for sharing with other tenants. Selected data objects are published and thereby available for sharing with other tenants and other tenants may subscribe to the selected objects. The data objects not selected are not shared and therefore not available for other tenants to subscribe to.

Figure 10:
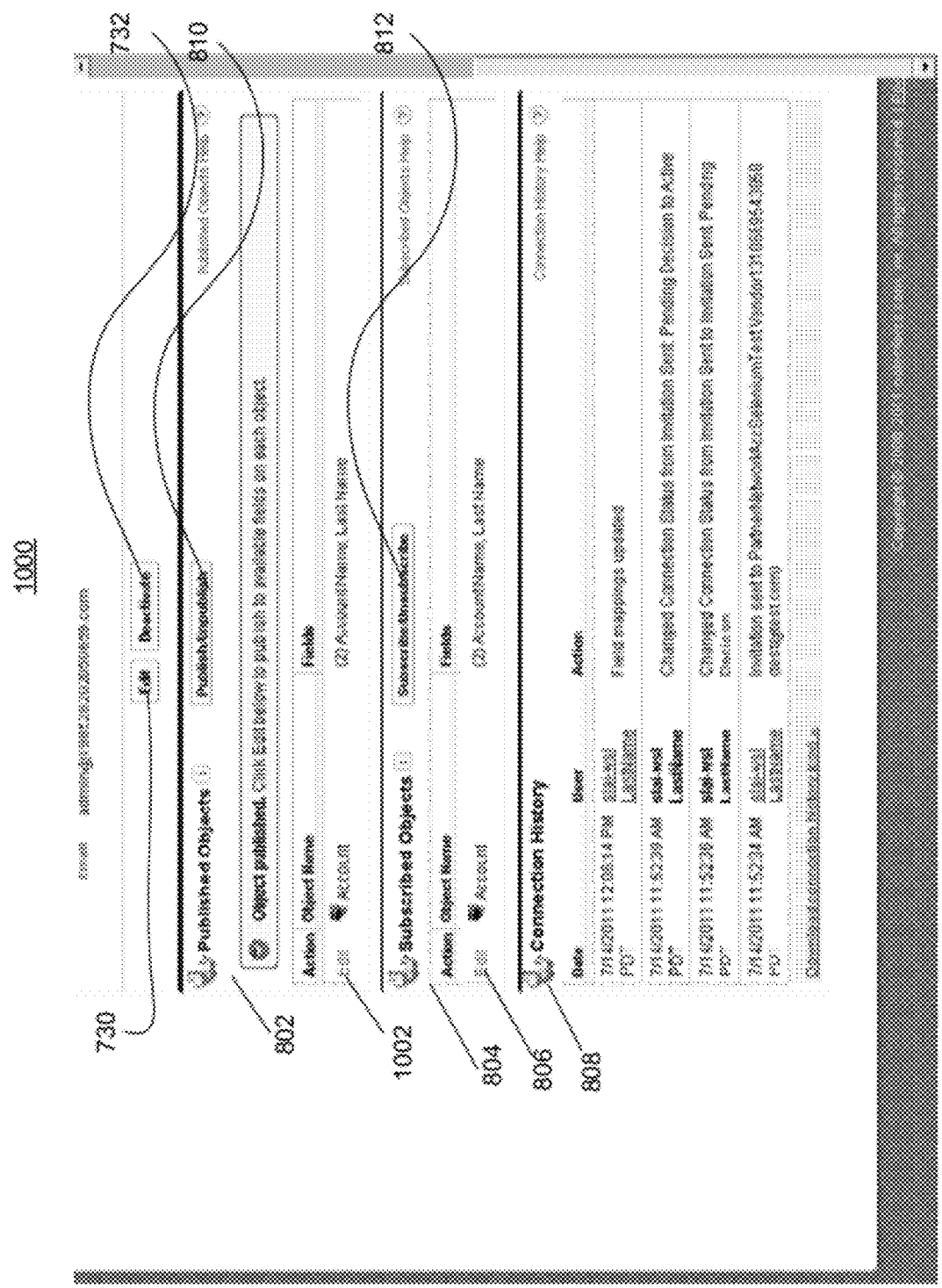
FIG. 10 shows a screenshot of an embodiment of the bottom part of a webpage showing published data objects.

FIG. 10 shows screenshot 1000 of an embodiment of webpage showing list of published objects. Screenshot 1000 may include edit button 730, deactivate button 732, published objects 802, subscribed objects 804, edit subscribed objects 806, connection history 808, publish button 810 and subscribe button 812 and edit published objects 1002. In other embodiments, screenshot 1000 may not have all of the elements listed and/or may have other elements instead of or in addition to those listed.

Screenshot 1000 may be a screenshot of a portion of a webpage, which is a continuation of webpage in FIG. 9. Edit button 730 and deactivate button 732 were discussed in conjunction with FIG. 7. Published objects 802, subscribed objects 804, edit subscribed objects 806, connection history 808, publish button 810, and subscribe button 812 were discussed in conjunction with FIG. 8. Edit published objects 1002, when selected, may cause a webpage similar to FIG. 11 to appear so that users may select data fields for publishing, which is discussed below.

Figure 11:
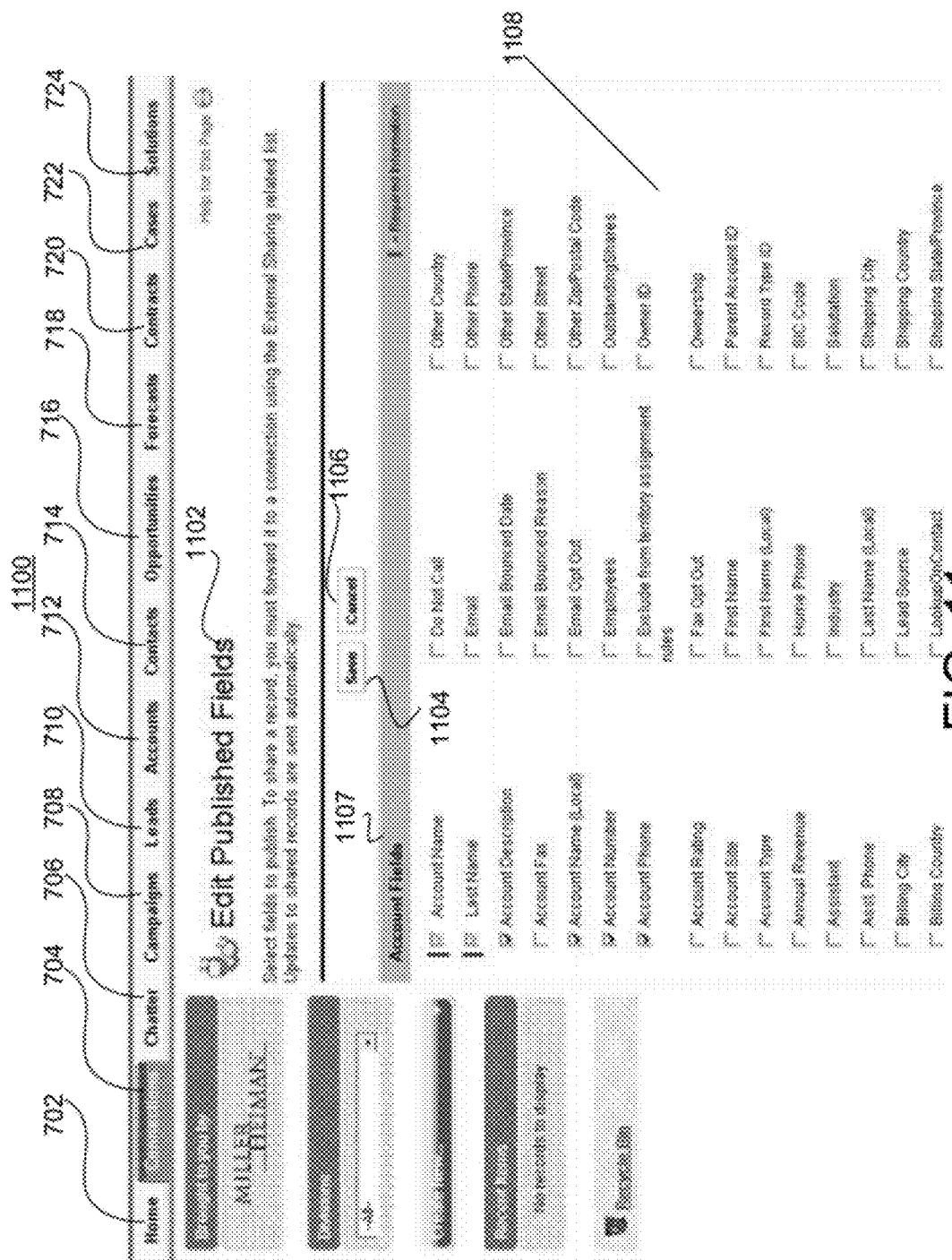
FIG. 11 shows a screenshot of an embodiment of a webpage for determining which fields of the data object will be shared.

FIG. 11 shows screenshot 1100 of an embodiment of webpage listing data fields for publishing. Screenshot 1100 may include home tab 702, connections tab 704, chatter tab 706, campaigns tab 708, leads tab 710, accounts tab 712, contacts tab 714, forecast tab 716, contracts tab 720, cases tab 722, solutions tabs 724, title 1102, save button 1104, cancel button 1106, data object 1107, and data fields 1108. In other embodiments, screenshot 1100 may not have all of the elements listed and/or may have other elements instead of or in addition to those listed.

Home tab 702, connections tab 704, chatter tab 706, campaigns tab 708, leads tab 710, accounts tab 712, contacts tab 714, forecast tab 716, contracts tab 720, cases tab 722, and solutions tabs 724 were discussed in conjunction with FIG. 7. Title 1102 shows the title of the section of the webpage for selecting data fields for sharing. Save button 1104, when selected, saves the current selection, which may result in the publishing and/or unpublishing of the newly selected and/or newly unselected data fields associated, respectively. Cancel button 1106 when selected may undo the changes to the selection of which field to publish and which fields to unpublish. Data object 1107 is the data object whose fields are chosen via the webpage of FIG. 11. Data fields 1108 lists the available data fields associated with data object 1107, which may be selected or unselected by adding or removing a check to or from a check box next to the field the check box selects or unselects.

Figure 12:
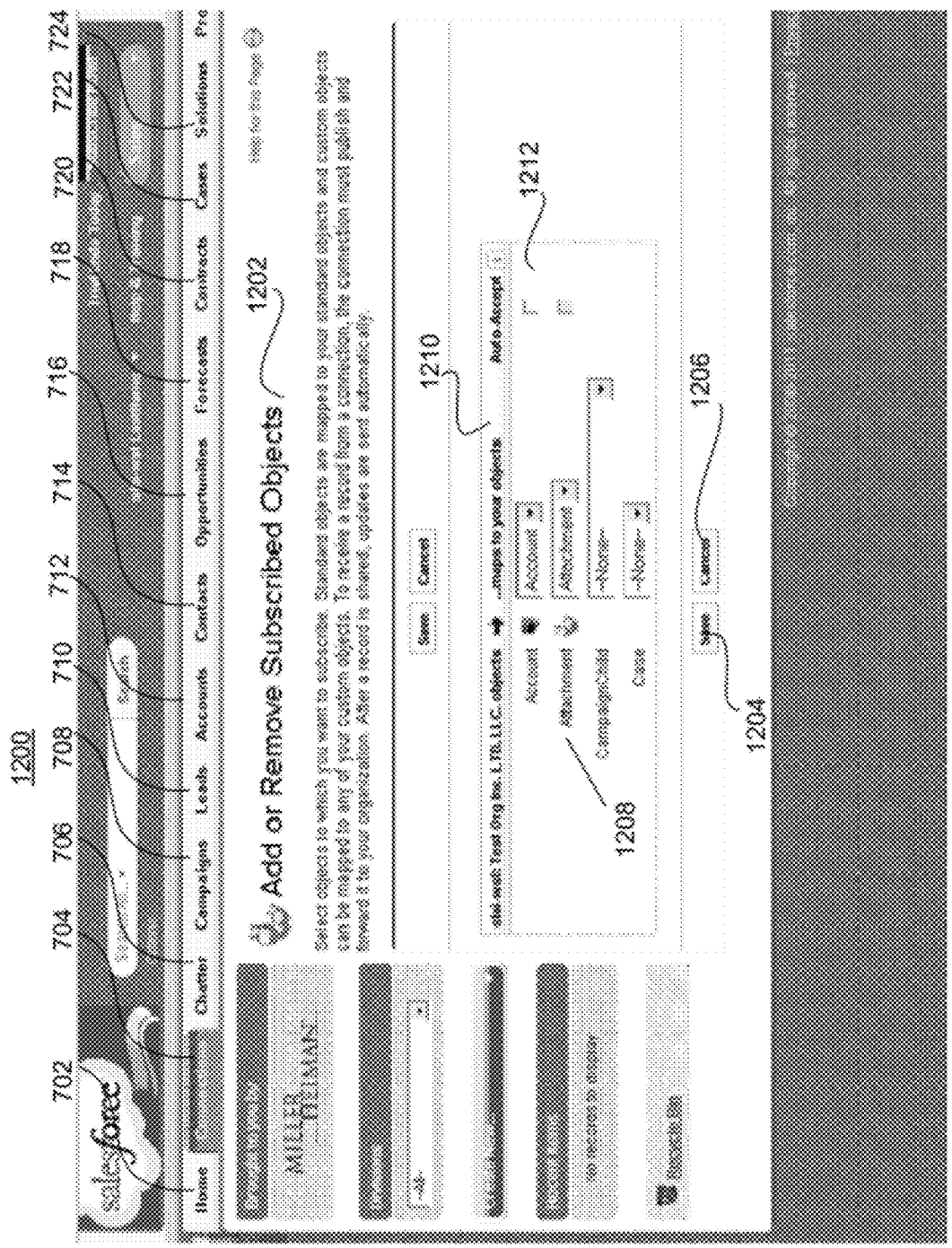
FIG. 12 shows a screenshot of an embodiment of a webpage subscribing to data objects.

FIG. 12 shows screenshot 1200 of an embodiment of webpage having a user interface to add or remove subscribed objects. Screenshot 1200 may include home tab 702, connections tab 704, chatter tab 706, campaigns tab 708, leads tab 710, accounts tab 712, contacts tab 714, forecast tab 716, contracts tab 720, cases tab 722, solutions tabs 724, title 1202, save button 1204, cancel button 1206, data objects 1208, mapping object 1210 and auto accept 1212. In other embodiments, screenshot 1200 may not have all of the elements listed and/or may have other elements instead of or in addition to those listed.

Home tab 702, connections tab 704, chatter tab 706, campaigns tab 708, leads tab 710, accounts tab 712, contacts tab 714, forecast tab 716, contracts tab 720, cases tab 722, and solutions tabs 724 were described in conjunction with FIG. 7. Title 1202 shows the title of the webpage, which indicates that the webpage of screenshot 1200 may be used for subscribing to an object. Save button 1204, when selected, may subscribe to the data object selected, which was already published by another tenant and/or cause the changes to the subscription that were selected to be saved. Cancel button 1204 when selected may undo the changes that were entered or not save the changes that were to the subscription that was entered. Data objects 1208 lists the available data objects that the user can subscribe to. Mapping object 1210 lists the mapping from the object to which the tenant has subscribed, to an object in the subscribing tenant's portion of the multitenant database. In an embodiment, some objects, such as standard objects, may be mapped by the system automatically. Other objects, such as custom objects, may be mapped by the tenants. Mapping object 1208 may be used for generating metadata for mapping the published object to the receiving data object. Mapping a published object to an object of the subscribing tenant, indicates to the server that the data from the published object is to be transferred to the object of the subscribing tenant that the published object is mapped to. Auto accept 1212, when selected, sets the preference for automatically accepting newly published object.

Figure 13:
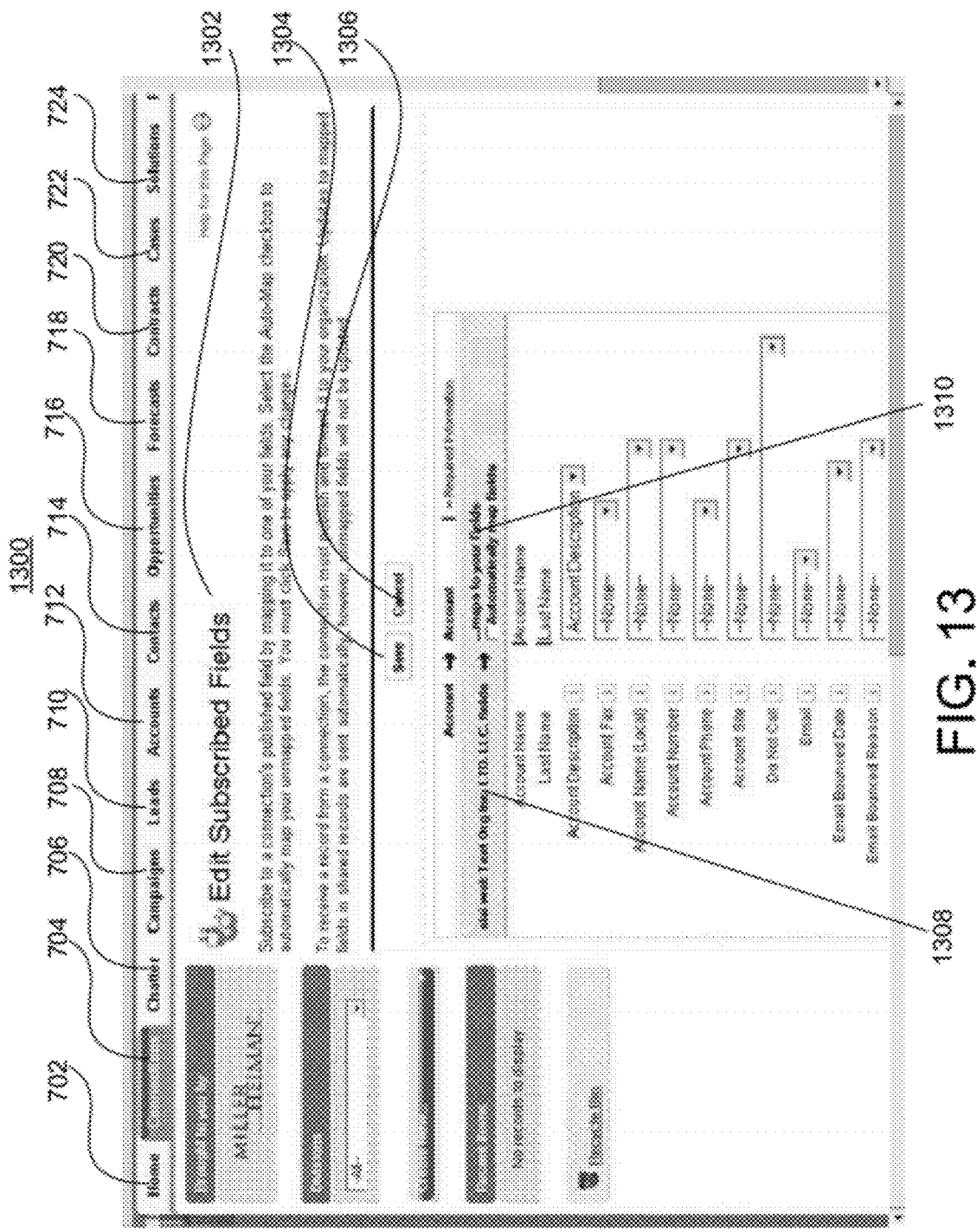
FIG. 13 shows a screenshot of an embodiment of a webpage for determining how a shared data field may be stored.

FIG. 13 shows screenshot 1300 of an embodiment of a webpage having a user interface to edit and map which fields the subscribing tenant is subscribed to. Screenshot 1300 may include home tab 702, connections tab 704, chatter tab 706, campaigns tab 708, leads tab 710, accounts tab 712, contacts tab 714, forecast tab 716, contracts tab 720, cases tab 722, solutions tabs 724, title 1302, save button 1304, cancel button 1306, subscribing data fields 1308 and receiving data fields 1310. In other embodiments, screenshot 1300 may not have all of the elements listed and/or may have other elements instead of or in addition to those listed.

Home tab 702, connections tab 704, chatter tab 706, campaigns tab 708, leads tab 710, accounts tab 712, contacts tab 714, forecast tab 716, contracts tab 720, cases tab 722, and solutions tabs 724 were discussed in conjunction with FIG. 7. Title 1302 shows the title of the section of the webpage, which includes instructions for selecting and mapping subscribed data fields in order to subscribe to the data fields. Save button 1304, when selected, may save the changes to the fields to which the tenant subscribes the selected data fields and map the published fields with the tenant's data fields. Unmapped fields may be automatically mapped by the system. Cancel button 1304 when selected may not subscribe any selected fields. Data fields 1308 lists the published available data fields. Receiving data fields 1310 lists options to map the published data fields to the receiving tenant's data field. Selected data fields may be published when save button 1304 is selected. Mapping may involve adding metadata to the receiving tenant's data fields.

Figure 14:
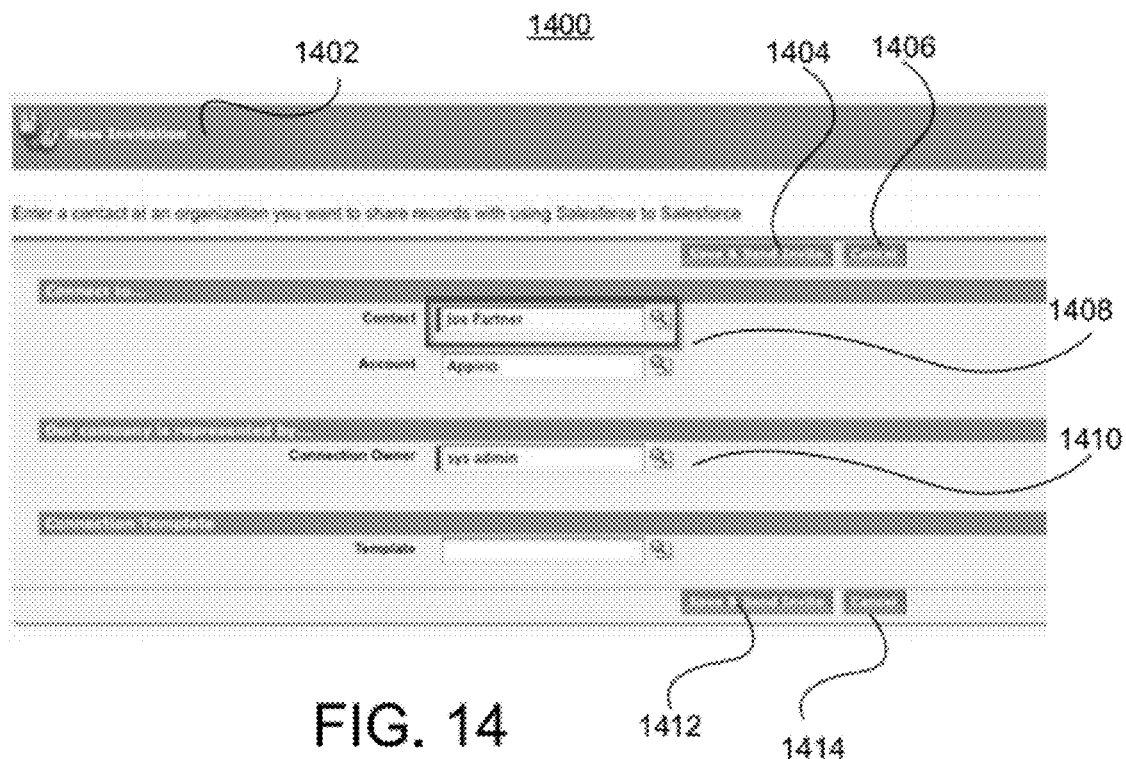
FIG. 14 shows a screenshot of an embodiment of a webpage inviting a tenant to establish connection for data sharing.

FIG. 14 shows screenshot 1400 of an embodiment of sending a request to share with the second tenant. Screenshot 1400 may include header 1402, save button 1404, cancel button 1406, contact 1408, sender 1410. Save 1412 and cancel 1414. In other embodiments, screenshot 1400 may not have all of the elements listed and/or may have other elements instead of or in addition to those listed.

Screenshot 1400 shows a screenshot of an invitation to share data by a tenant of the multi-tenant database with another tenant using handshaking protocol to establish the connection. In the invite-to-share model, a first tenant invites a second tenant to share data. The second tenant acknowledges sharing data. Data sharing can be one-way or two-way sharing. Header 1402 shows the title of the screenshot of a new invitation. Save button 1404, when selected, may cause the invitation to be presented to the invitee. Cancel button 1406 when selected cancels the invitation and clears the information filled in the invitation. Contact 1408 may list the information about the second tenant receiving the invitation to share data; the information may include the name of the authorized personnel and the account or tenant name. Sender 1410 shows the information about the authorized personnel of the tenant sending the invitation. Save 1412 when selected may perform similar to save button 1404. Cancel 1414 when selected may perform similar to cancel button 1406.

Figure 15:
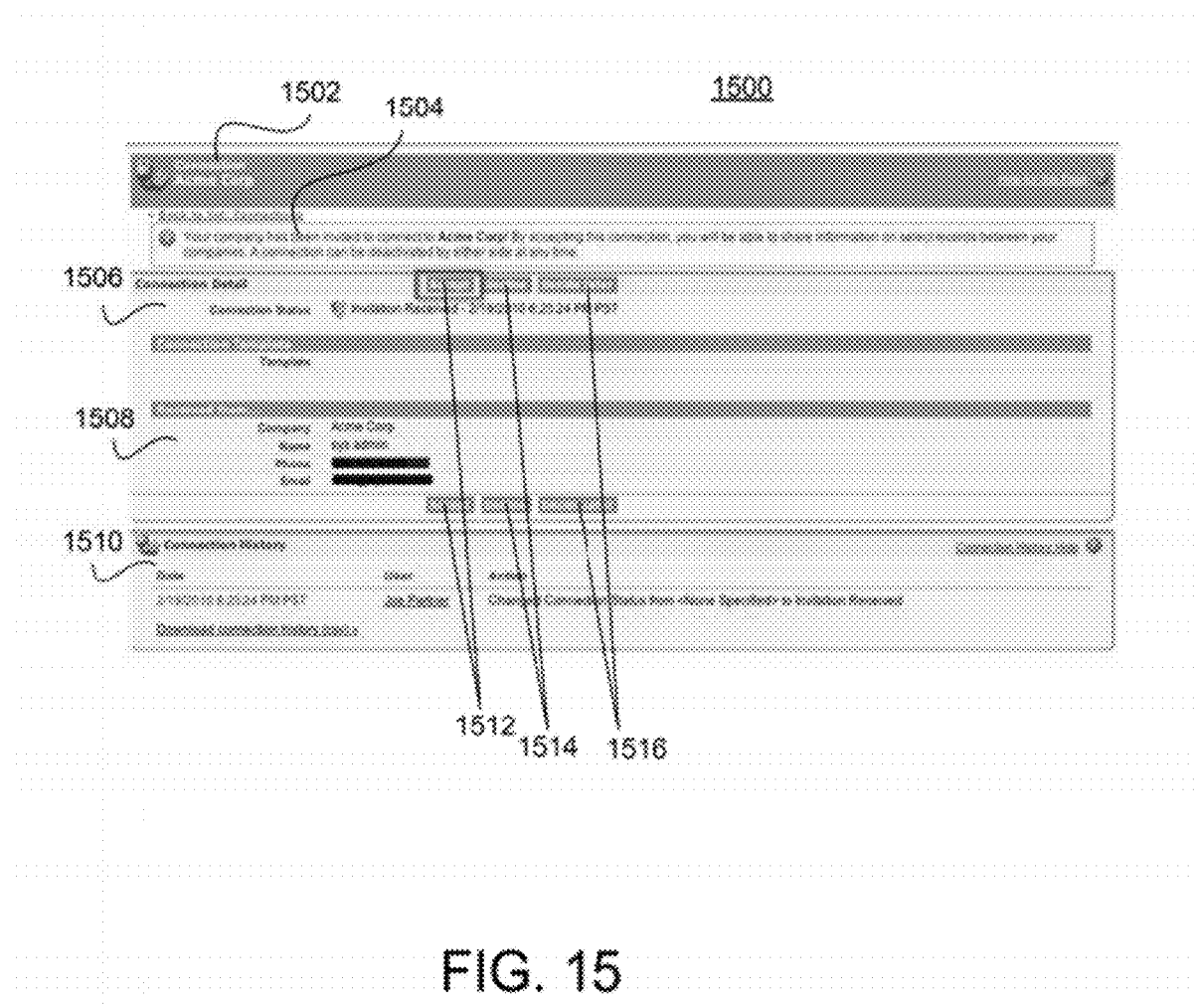
FIG. 15 shows a screenshot of an embodiment of a webpage accepting invitation to connect for data sharing.

FIG. 15 shows screenshot 1500 of an embodiment of a webpage receiving invitation to share data. Screenshot 1500 may include header 1502, message 1504, connection details 1506, tenant invitation form 1508, connection history 1510, accept 1512, decline 1514 and decide later 1516. In other embodiments, screenshot 1500 may not have all of the elements listed and/or may have other elements instead of or in addition to those listed.

Screenshot 1500 shows a screenshot showing a webpage with received invitation to share data from the first tenant. Header 1502 shows the tenant of current connection. Message 1504 displays a message about the invitation to connect to the tenant sending the invitation. Connection details 1506 displays the details of the connection to share data. Tenant invitation form 1508 displays name of the tenant sending the invitation to connect. Connection history 1510 displays the connection history. Accept 1512 when selected causes to accept the invitation to connect to the tenant to share data. Decline 1514 when selected causes to decline an invitation to share data with the sender. Decide later 1516 when selected may defer the decision to connect to the sender.

System Overview

Figure 16:
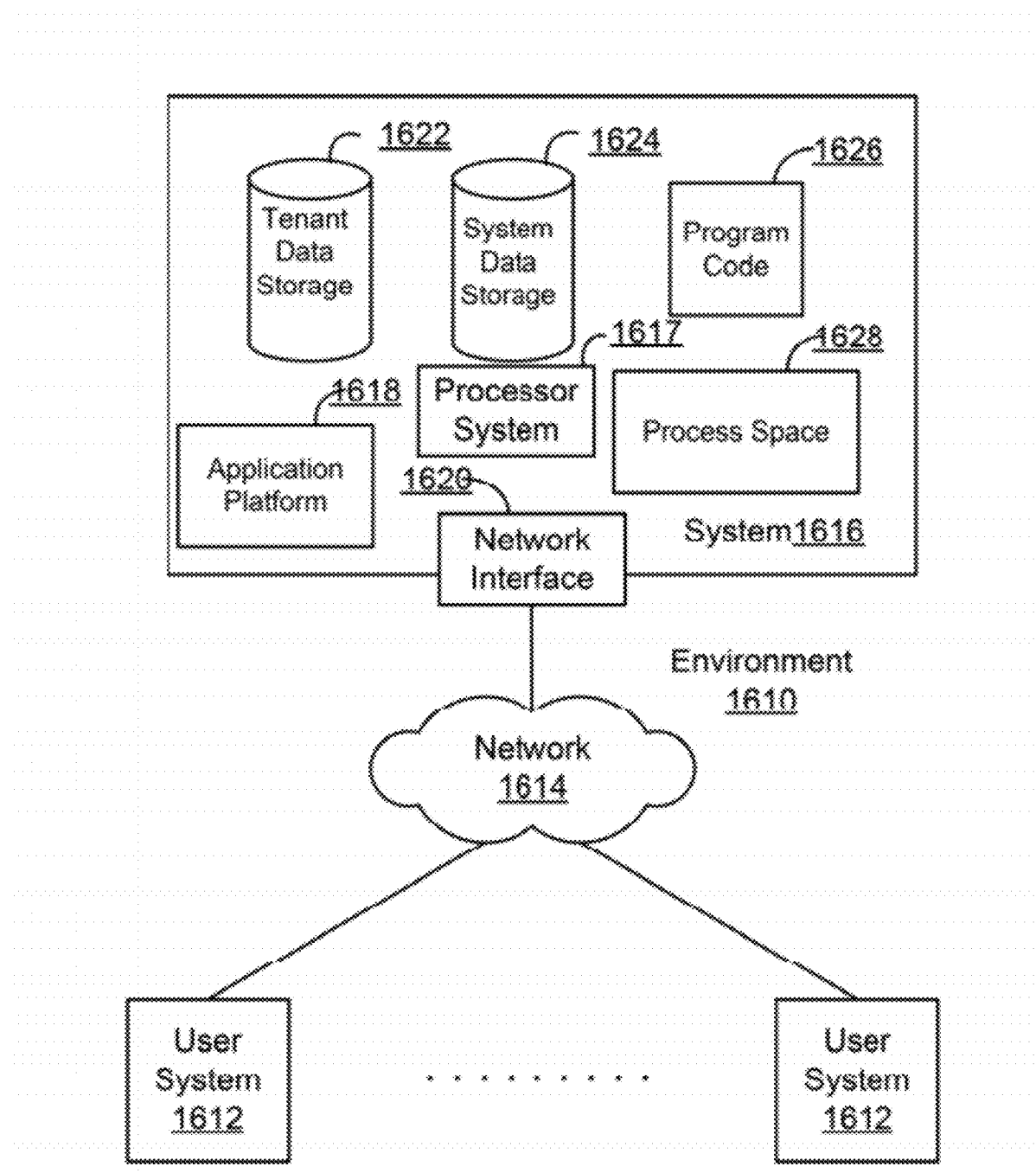
FIG. 16 shows a block diagram of an embodiment of an environment where in an on-demand database service might be used for methods and systems for exploring objects in a data dictionary.

FIG. 16 illustrates a block diagram of an environment 1610 wherein an on-demand database service might be used. Environment 1610 may include user systems 1612, network 1614, system 1616, processor system 1617, application platform 1618, network interface 1620, tenant data storage 1622, system data storage 1624, program code 1626, and process space 1628. In other embodiments, environment

1610 may not have all of the components listed and/or may have other elements instead of, or in addition to, those listed above.

Environment 1610 is an environment in which an on-demand database service exists. User system 1612 may be any machine or system that is used by a user to access a database user system. For example, any of user systems 1612 can be a handheld computing device, a mobile phone, a laptop computer, a work station, and/or a network of computing devices. As illustrated in FIG. 16 (and in more detail in FIG. 17) user systems 1612 might interact via a network 1614 with an on-demand database service, which is system 1616.

An on-demand database service, such as system 1616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 1616" and "system 1616" will be used interchangeably herein. A database image may include one or more database objects. A relational database management system (RDMS) or the equivalent may execute storage and retrieval of information against the database object(s). Application platform 1618 may be a framework that allows the applications of system 1616 to run, such as the hardware and/or software, e.g., the operating system. In an embodiment, on-demand database service 1616 may include an application platform 1618 that enables creation, managing and executing one or more applications developed by the provider of the on-demand database service, users accessing the on-demand database service via user systems 1612, or third party application developers accessing the on-demand database service via user systems 1612.

The users of user systems 1612 may differ in their respective capacities, and the capacity of a particular user system 1612 might be entirely determined by permissions (permission levels) for the current user. For example, where a salesperson is using a particular user system 1612 to interact with system 1616 that user system has the capacities allotted to that salesperson. However, while an administrator is using that user system to interact with system 1616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 1614 is any network or combination of networks of devices that communicate with one another. For example, network 1614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 1612 might communicate with system 1616 using TCP/IP and, at a higher network level, use other common Internet protocols to communicate, such as HTTP, FTP, AFS, WAP, etc. In an example where HTTP is used, user system 1612 might include an HTTP client commonly referred to as a "browser" for sending and receiving HTTP messages to and from an HTTP server at system 1616. Such an HTTP server might be implemented as the sole network interface between system 1616 and network 1614, but other techniques might be used as well or instead. In some implementations, the interface between system 1616 and network 1614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 1616, shown in FIG. 16, implements a web-based customer relationship management (CRM) system. For example, in one embodiment, system 1616 includes application servers configured to implement and execute CRM software applications as well as provide related data, code, forms, webpages and other information to and from user systems 1612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 1616 implements applications other than, or in addition to, a CRM application. For example, system 1616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 1616.

One arrangement for elements of system 1616 is shown in FIG. 16, including a network interface 1620, application platform 1618, tenant data storage 1622 for tenant data 1723, system data storage 1624 for system data 1725 accessible to system 1616 and possibly multiple tenants, program code 1626 for implementing various functions of system 1616, and a process space 1628 for executing MTS system processes and tenant-specific processes, such as running applications as part of an application hosting service. Additional processes that may execute on system 1616 include database indexing processes.

Several elements in the system shown in FIG. 16 include conventional, well-known elements that are explained only briefly here. For example, each user system 1612 could include a desktop personal computer, workstation, laptop, PDA, cell phone, or any wireless access protocol (WAP) enabled device or any other computing device capable of interfacing directly or indirectly to the Internet or other network connection. User system 1612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 1612 to access, process and view information, pages and applications available to it from system 1616 over network 1614. Each user system 1612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 1616 or other systems or servers. For example, the user interface device can be used to access data and applications hosted by system 1616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 1612 and all of its components are operator configurable using applications, such as a browser, including computer code run using a central processing unit such as an Intel Pentium® processor or the like. Similarly, system 1616 (and additional instances of an MTS, where more than one is present) and all of their components might be operator configurable using application(s) including computer code to run using a central processing unit such as processor system 1617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 1616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 1616 is configured to provide webpages, forms, applications, data and media content to user (client) systems 1612 to support the access by user systems 1612 as tenants of system 1616. As such, system 1616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline back-ups or other redundancies, etc., and might include a distributed database or storage network and associated processing intelligence.

Figure 17:
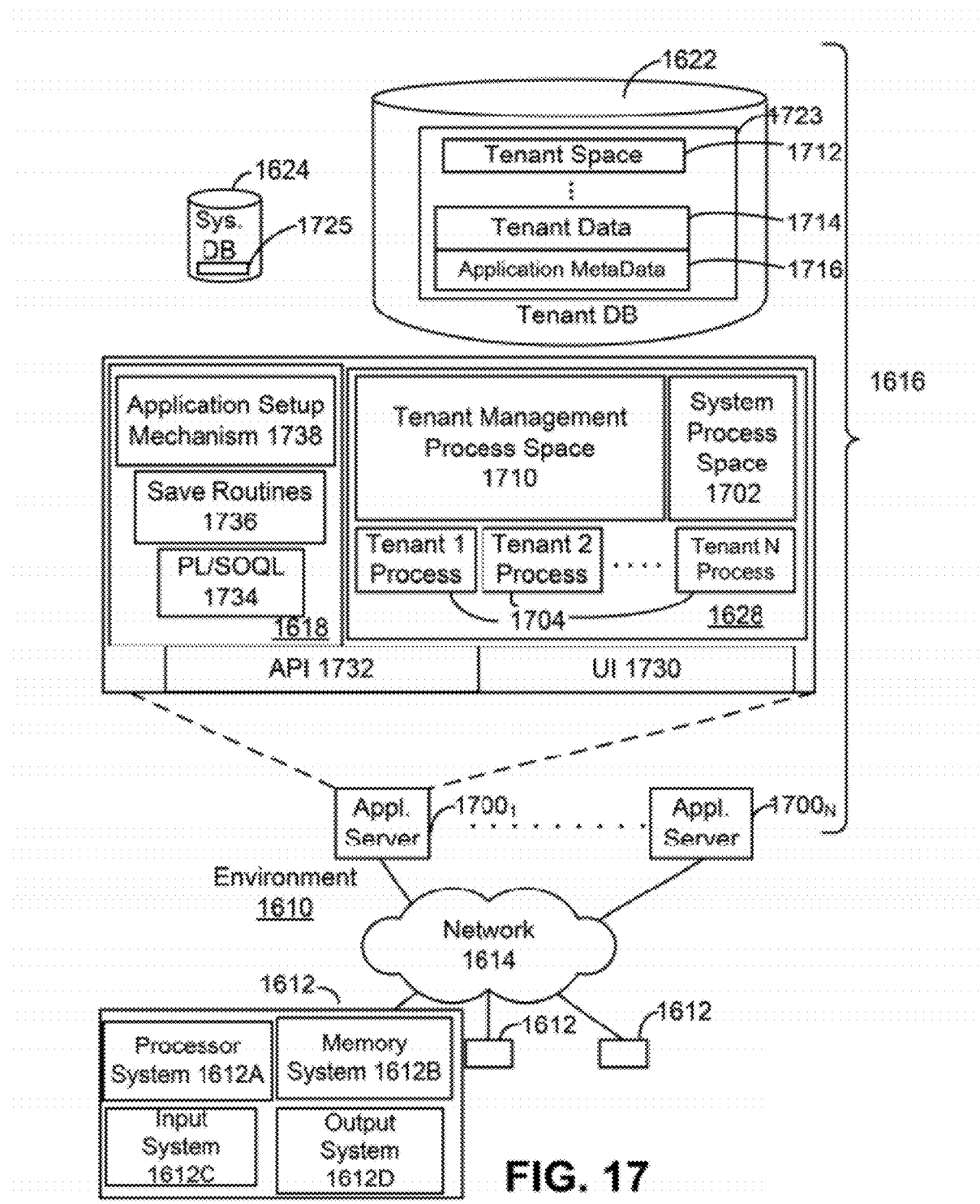
FIG. 17 shows a block diagram of an embodiment of elements of FIG. 16 and various possible interconnections between elements in an embodiment for methods and systems for exploring objects in a data dictionary.

FIG. 17 also illustrates environment 1610. However, in FIG. 17 elements of system 1616 and various interconnections in an embodiment are further illustrated. FIG. 17 shows that user system 1612 may include processor system 1612A, memory system 1612B, input system 1612C, and output system 1612D. FIG. 16 shows network 1614 and system 1616. FIG. 17 also shows that system 1616 may include tenant data storage 1622, tenant data 1723, system data storage 1624, system data 1725, User Interface (UI) 1730, Application Program Interface (API) 1732, PL/SOQL 1734, save routines 1736, application setup mechanism 1738, applications servers $1700_1$-$1700_N$, system process space 1602, tenant process spaces 1604, tenant management process space 1610, tenant storage area 1612, user storage 1614, and application metadata 1616. In other embodiments, environment 1610 may not have the same elements as those listed above and/or may have other elements instead of, or in addition to, those listed above.

User system 1612, network 1614, system 1616, tenant data storage 1622, and system data storage 1624 were discussed above in FIG. 16. Regarding user system 1612, processor system 1612A may be any combination of one or more processors. Memory system 1612B may be any combination of one or more memory devices, short term, and/or long term memory. Input system 1612C may be any combination of input devices, such as one or more keyboards, mice, trackballs, scanners, cameras, and/or interfaces to networks. Output system 1612D may be any combination of output devices, such as one or more monitors, printers, and/or interfaces to networks. As shown by FIG. 16, system 1616 may include a network interface 1620 (of FIG. 16) implemented as a set of HTTP application servers 1700, an application platform 1618, tenant data storage 1622, and system data storage 1624. Also shown is system process space 1602, including individual tenant process spaces 1604 and a tenant management process space 1610. Each application server 1700 may be configured to tenant data storage 1622 and the tenant data 1723 therein, and system data storage 1624 and the system data 1725 therein to serve requests of user systems 1612. The tenant data 1723 might be divided into individual tenant storage areas 1612, which can be either a physical arrangement and/or a logical arrangement of data. Within each tenant storage area 1612, user storage 1614 and application metadata 1616 might be similarly allocated for each user. For example, a copy of a user's most recently used (MRU) items might be stored to user storage 1614. Similarly, a copy of MRU items for an entire organization that is a tenant might be stored to tenant storage area 1612. A UI 1730 provides a user interface and an API 1732 provides an application programmer interface to system 1616 resident processes to users and/or developers at user systems 1612. The tenant data and the system data may be stored in various databases, such as one or more Oracle™ databases.

Application platform 1618 includes an application setup mechanism 1738 that supports application developers' creation and management of applications, which may be saved as metadata into tenant data storage 1622 by save routines 1736 for execution by subscribers as one or more tenant process spaces 1604 managed by tenant management process 1610 for example. Invocations to such applications may be coded using PL/SOQL 1734 that provides a programming language style interface extension to API 1732. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manage retrieving application metadata 1616 for the subscriber making the invocation and executing the metadata as an application in a virtual machine.

Each application server 1700 may be communicably coupled to database systems, e.g., having access to system data 1725 and tenant data 1723, via a different network connection. For example, one application server 1700$_1$ might be coupled via the network 1614 (e.g., the Internet), another application server 1700$_{N-1}$ might be coupled via a direct network link, and another application server 1700$_N$ might be coupled by yet a different network connection. Transfer Control Protocol and Internet Protocol (TCP/IP) are typical protocols for communicating between application servers 1700 and the database system. However, it will be apparent to one skilled in the art that other transport protocols may be used to optimize the system depending on the network interconnect used.

In certain embodiments, each application server 1700 is configured to handle requests for any user associated with any organization that is a tenant. Because it is desirable to be able to add and remove application servers from the server pool at any time for any reason, there is preferably no server affinity for a user and/or organization to a specific application server 1700. In one embodiment, therefore, an interface system implementing a load balancing function (e.g., an F5 Big-IP load balancer) is communicably coupled between the application servers 1700 and the user systems 1612 to distribute requests to the application servers 1700. In one embodiment, the load balancer uses a least connections algorithm to route user requests to the application servers 1700. Other examples of load balancing algorithms, such as round robin and observed response time, also can be used. For example, in certain embodiments, three consecutive requests from the same user could hit three different application servers 1700, and three requests from different users could hit the same application server 1700. In this manner, system 1616 is multi-tenant, wherein system 1616 handles storage of, and access to, different objects, data and applications across disparate users and organizations.

As an example of storage, one tenant might be a company that employs a sales force where each salesperson uses system 1616 to manage their sales process. Thus, a user might maintain contact data, leads data, customer follow-up data, performance data, goals and progress data, etc., all applicable to that user's personal sales process (e.g., in tenant data storage 1622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 1616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 1616 might also maintain system level data usable by multiple tenants or other data. Such system level data might include industry reports, news, postings, and the like that are sharable among tenants.

In certain embodiments, user systems 1612 (which may be client systems) communicate with application servers 1700 to request and update system-level and tenant-level data from system 1616 that may require sending one or more queries to tenant data storage 1622 and/or system data storage 1624. System 1616 (e.g., an application server 1700 in system 1616) automatically generates one or more SQL statements (e.g., one or more SQL queries) that are designed to access the desired information. System data storage 1624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/8128,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Method for Using the Environment (FIGS. 16 and 17)

Figure 18:
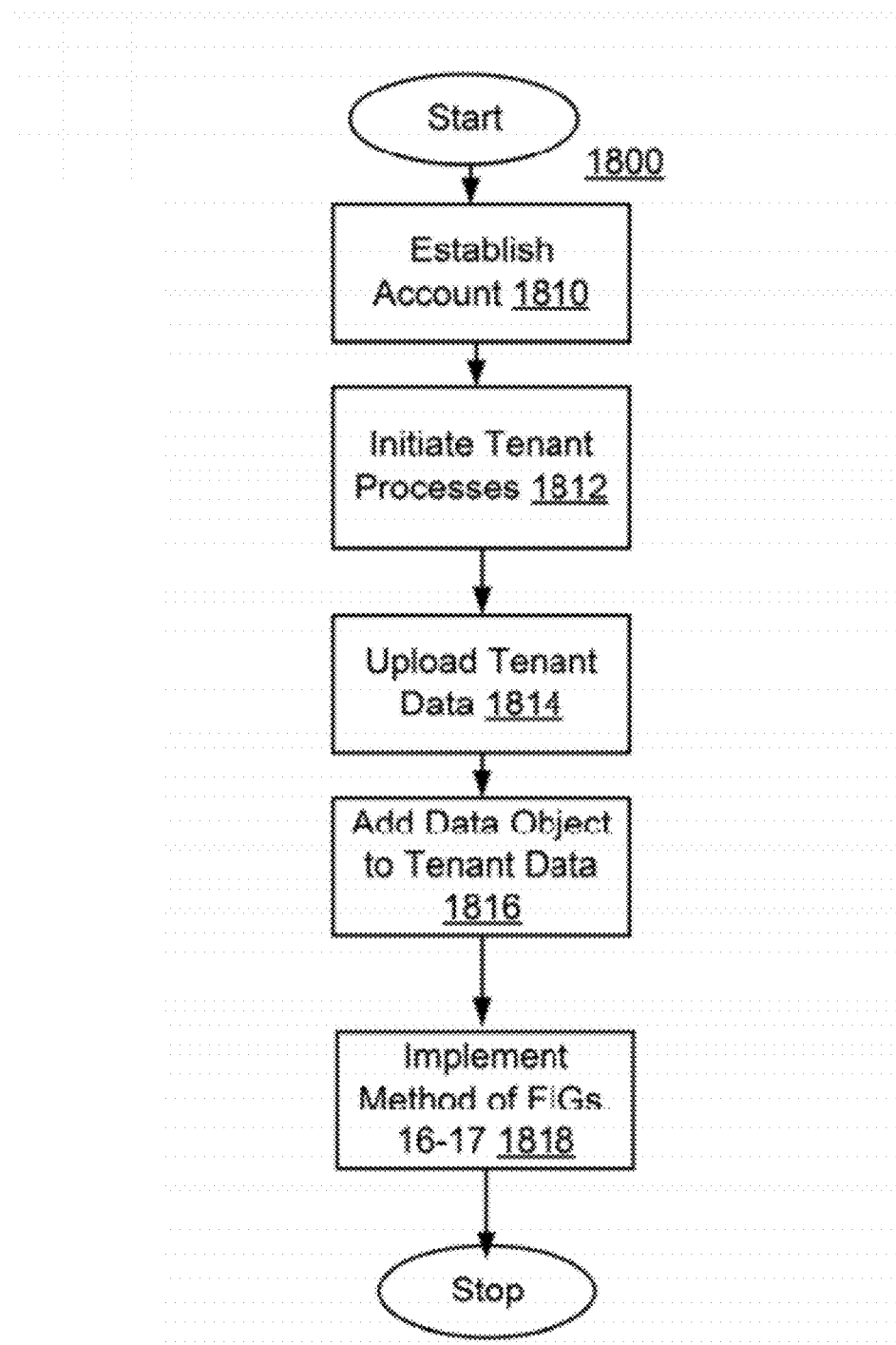
FIG. 18 illustrates an embodiment of an environment within which the system for exploring objects in a data dictionary may operate.

FIG. 18 shows a flowchart of an example of a method 1800 of using environment 1610. In step 1810, user system 1612 (FIGS. 16 and 17) establishes an account. In step 1812, one or more tenant process space 1704 (FIG. 17) is initiated on behalf of user system 1612, which may also involve setting aside space in tenant space 1712 (FIG. 17) and tenant data 1714 (FIG. 17) for user system 1612. Step 1812 may also involve modifying application metadata to accommodate user system 1612. In step 1814, user system 1612 uploads data. In step 1816, one or more data objects are added to tenant data 1714 where the data uploaded is stored. In step 1818, the methods associated with FIGS. 16-17 may be implemented. In another embodiment, although depicted as distinct steps in FIG. 18, steps 1802-1818 may not be distinct steps. In other embodiments, method 1800 may not have all of the above steps and/or may have other steps in addition to, or instead of, those listed above. The steps of method 1800 may be performed in another order. Subsets of the steps listed above as part of method 1800 may be used to form their own method.

Method for Creating the Environment (FIGS. 16 and 17)

Figure 19:
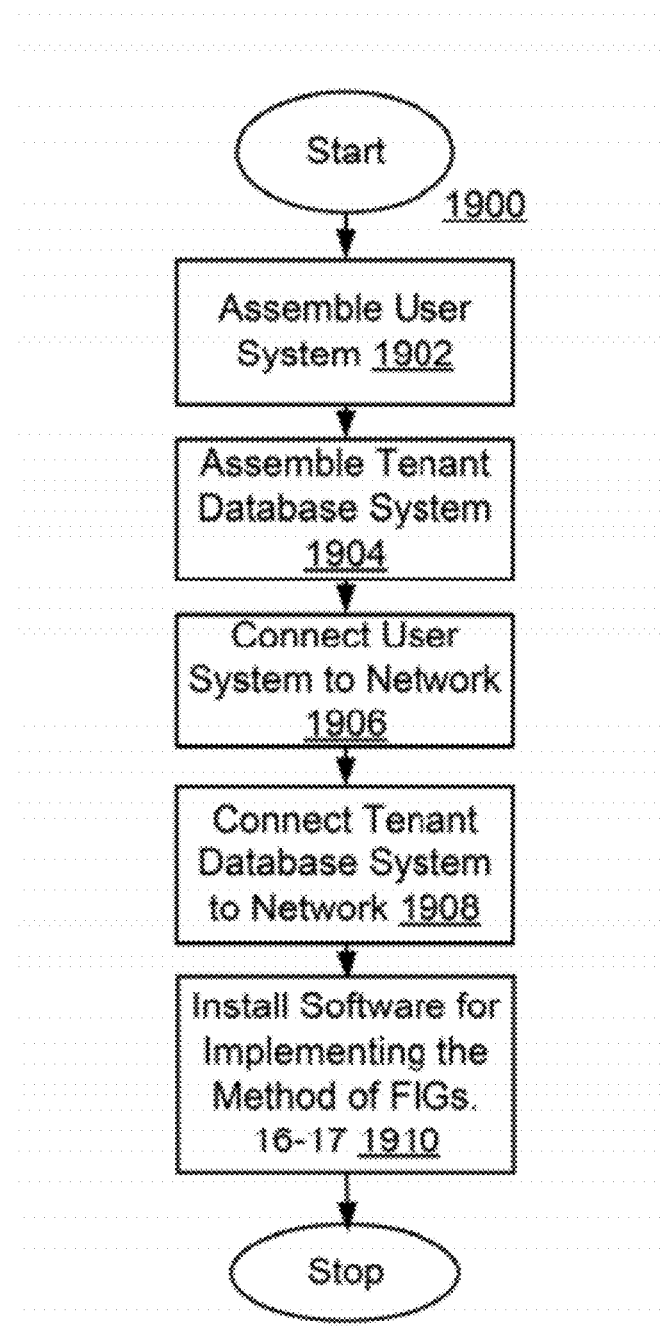
FIG. 19 illustrates embodiment of elements of FIG. 18 and various possible interconnections between elements of the environment.

FIG. 19 is a method of making environment 1610, in step 1902, user system 1612 (FIGS. 16 and 17) is assembled, which may include communicatively coupling one or more processors, one or more memory devices, one or more input devices (e.g., one or more mice, keyboards, and/or scanners), one or more output devices (e.g., one or more printers, one or more interfaces to networks, and/or one or more monitors) to one another.

In step 1904, system 1616 (FIGS. 16 and 17) is assembled, which may include communicatively coupling one or more processors, one or more memory devices, one or more input devices (e.g., one or more mice, keyboards, and/or scanners), one or more output devices (e.g., one or more printers, one or more interfaces to networks, and/or one or more monitors) to one another. Additionally assembling system 1616 may include installing application platform 1618, network interface 1620, tenant data storage 1622, system data storage 1624, system data 1725, program code 1626, process space 1628, UI 1730, API 1732, PL/SOQL 1734, save routine 1736, application setup mechanism 1738, applications servers $100_1$-$100_N$, system process space 102, tenant process spaces 1704, tenant management process space 110, tenant space 1712, tenant data 1714, and application metadata 116 (FIG. 17).

In step 1906, user system 1612 is communicatively coupled to network 1704. In step 1908, system 1616 is communicatively coupled to network 1704 allowing user system 1612 and system 1616 to communicate with one another (FIG. 17). In step 1910, one or more instructions may be installed in system 1616 (e.g., the instructions may be installed on one or more machine readable media, such as computer readable media, therein) and/or system 1616 is otherwise configured for performing the steps of methods associated with FIGS. 16-19. In an embodiment, each of the steps of method 1900 is a distinct step. In another embodiment, although depicted as distinct steps in FIG. 19, steps 1902-1910 may not be distinct steps. In other embodiments, method 1900 may not have all of the above steps and/or may have other steps in addition to, or instead of, those listed above. The steps of method 1900 may be performed in another order. Subsets of the steps listed above as part of method 1900 may be used to form their own method.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method of sharing data in a multi-tenant database system, comprising:
    determining at a host system, data that needs to be transferred between a first tenant's portion of the multi-tenant database and a second tenant's portion of the multi-tenant database, the host system including one or more machines having a processor system with at least one or more processors and a memory system that stores the multi-tenant database, wherein the first tenant's portion of the multi-tenant database is isolated from the second tenant's portion of the multi-tenant database;
    reading metadata associated with the data from a cache, the metadata already being in the cache as a result of a prior transfer of the data, the metadata being stored in the cache for a finite predetermined period of time;
    determining whether the finite predetermined period of time has expired, and when the finite predetermined period of time has not expired, determining whether changes have occurred that affect the metadata associated with the data, when the changes have occurred, fetching new metadata and storing the new metadata in cache in place of the metadata that was previously stored in cache, wherein the finite predetermined period of time is 15 minutes;
    transferring the determined data from the first tenant's portion of the multi-tenant database to the second tenant's portion of the multi-tenant database system based on the metadata, the metadata defining how to transfer the data between the first tenant's portion of the multi-tenant database and the second tenant's portion of the multi-tenant database.

2. The method of claim 1 further comprising determining that another transfer of data needs to occur, determining whether the metadata is in the cache, if the metadata is not in the cache fetching the metadata and storing the metadata in the cache for a finite predetermined period of time that is long enough to be useful for multiple transfers of data.

3. The method of claim 1, if the finite predetermined period of time has expired, fetching new metadata from the multi-tenant database and storing the new metadata in cache for the predetermined period of time.

4. The method of claim 1, the metadata including information about how to transfer the data.

5. The method of claim 1, the metadata including a mapping of locations in a portion of the database of the first tenant to locations in a portion of the database of the second tenant between which data is being transferred.

6. The method of claim 5 further comprising:
after establishing connection, receiving at the host system from the first tenant's machine, a request to allow the second tenant to subscribe to particular data; and
updating a list of data available to the second tenant to subscribe to from the particular data; the list being stored in a location that the second tenant has access to.

7. The method of claim 1, the metadata including at least an indication of a format of the data in a location of a portion of the database of the first tenant and an indication of a format of the data in the location of a portion of the database of the second tenant, the data being transferred between the location of the portion of the database of the first tenant and the location of the portion of the database of the second tenant.

8. The method of claim 1 further comprising:
receiving at the host system from a first tenant's machine a request to establish a connection for sharing data between a portion of the database of the first tenant and a portion of the database of the second tenant;
sending from the host system to the second tenant's machine, an invitation to establish the connection;
receiving at the host system from the second tenant's machine, an approval to establish the connection;
sending from the host system to the first tenant's machine, a acknowledgement of receipt of the approval to establish the connection; and
establishing a connection between the first tenant's portion of the database and the second tenant's portion of the database.

9. The method of claim 1, the determining that data needs to be transferred being triggered by an update in the data in the first tenant's portion.

10. The method of claim 1, the determining that data needs to be transferred being triggered by a request from the second tenant.

11. The method of claim 1, the determining that data needs to be transferred being triggered by a request from an administrator of the second tenant to transfer data.

12. The method of claim 1 further comprising:
determining that another transfer of data needs to occur, determining whether the metadata is in the cache, if the metadata is not in the cache fetching the metadata and storing the metadata in the cache for a finite predetermined period of time that is long enough to be useful for multiple transfers of data;
the metadata being stored in the cache for a finite predetermined period of time, determining that another transfer of data needs to occur, determining whether the finite predetermined period of time has expired, if the finite predetermined period of time has not expired determining whether changes have occurred that affect the metadata associated with the data to share, if the changes have occurred, fetching new metadata and storing the new metadata in cache in place of the metadata that was previously stored in cache;
fetching, if the finite predetermined period of time has expired, new metadata from the multi-tenant database and storing the new metadata in cache for the predetermined period of time, the metadata including information about how to transfer the data;
establishing a connection prior to sharing the data by:
receiving at the host system from a first tenant's machine a request to a establish connection for sharing data between a portion of the database of the first tenant and a portion of the database of the second tenant,
sending from the host system to the second tenant's machine, an invitation to establish the connection,
receiving at the host system from the second tenant's machine, an approval to establish the connection,
sending from the host system to the first tenant's machine, the approval to establish the connection, and
establishing connection between the first tenant's portion and the second tenant's portion;
after establishing connection:
receiving at the host system from the first tenant's machine, a request to allow the second tenant to subscribe to particular data,
updating a list of data available to the second tenant to subscribe to from the particular data, the list being stored in a location that the second tenant has access to;
the determining that data needs to be transferred being triggered by an update in the data in the first tenant's portion of the database,
the determining that data needs to be transferred being triggered by a request from the second tenant's portion of the database, and
the determining that data needs to be transferred being triggered by a request from an administrator of the second tenant to transfer data.

13. A non-transitory machine-readable medium carrying one or more sequences of instructions for implementing a method for providing an interface for object relationships, the method comprising:
determining at a host system, data that needs to be transferred between a first tenant's portion of the multi-tenant database and a second tenant's portion of the multi-tenant database, the host system including one or more machines having a processor system with at least one or more processors and a memory system that stores the multi-tenant database, wherein the first tenant's portion of the multi-tenant database is isolated from the second tenant's portion of the multi-tenant database;
reading metadata associated with the data from a cache, the metadata already being in the cache as a result of a prior transfer of the data, the metadata being stored in the cache for a finite predetermined period of time;
determining whether the finite predetermined period of time has expired, and when the finite predetermined period of time has not expired, determining whether changes have occurred that affect the metadata associated with the data, when the changes have occurred, fetching new metadata and storing the new metadata in cache in place of the metadata that was previously stored in cache, wherein the finite predetermined period of time is 15 minutes; and
transferring the determined data from the first tenant's portion of the multi-tenant database to the second tenant's portion of the multi-tenant database system based on the metadata, the metadata defining how to transfer the data between the first tenant's portion of the multi-tenant database and the second tenant's portion of the multi-tenant database.

* * * * *